(12) United States Patent
Dickert et al.

(10) Patent No.: US 9,993,961 B2
(45) Date of Patent: Jun. 12, 2018

(54) PEX EXPANDING TOOL

(71) Applicant: Milwaukee Electric Tool Corporation, Brookfield, WI (US)

(72) Inventors: Corey Dickert, Brookfield, WI (US); Alex Huber, Milwaukee, WI (US); Jarrod Kotes, Grafton, WI (US); Will Didier, Cedarburg, WI (US); Ian Zimmermann, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days. days.

(21) Appl. No.: 15/832,615

(22) Filed: Dec. 5, 2017

(65) Prior Publication Data

US 2018/0093410 A1    Apr. 5, 2018

Related U.S. Application Data

(63) Continuation of application No. 15/133,029, filed on Apr. 19, 2016, now Pat. No. 9,862,137.
(Continued)

(51) Int. Cl.
*B29C 57/04* (2006.01)
*B29L 23/00* (2006.01)
(Continued)

(52) U.S. Cl.
CPC .... *B29C 57/045* (2013.01); *B29K 2023/0691* (2013.01); *B29K 2105/258* (2013.01); *B29L 2023/22* (2013.01)

(58) Field of Classification Search
CPC ......... B29C 53/56; B29C 61/00; B29C 65/20; B29C 65/32; B29C 66/30321;
(Continued)

(56) References Cited

U.S. PATENT DOCUMENTS 1,404,819 A    1/1922   Wiedeke
2,085,447 A    6/1937   Plaine
(Continued)

FOREIGN PATENT DOCUMENTS

DE    19730054 C1    3/1999
DE    19924695 A1    11/2000
(Continued)

*Primary Examiner* — Alison L Hindenlang
*Assistant Examiner* — Cedrick S Williams
(74) *Attorney, Agent, or Firm* — McDonnell Boehnen Hulbert & Berghoff LLP

(57) ABSTRACT

An expanding tool comprising: an actuator comprising a cylindrical housing that defines an actuator housing cavity; a primary ram disposed within the actuator housing cavity, the primary ram defining an internal primary ram cavity; a secondary ram disposed within the internal primary ram cavity; a cam roller carrier coupled to a distal end of the secondary ram; a drive collar positioned within a distal end of the actuator housing cavity; a roller clutch disposed within an internal cavity defined by an inner surface of the drive collar; a shuttle cam positioned between the roller clutch and a distal end of the primary ram; an expander cone coupled to the primary ram; and an expander head operably coupled to the drive collar. When triggered, the actuator first rotates the expander head and then the actuator expands the expander head.

20 Claims, 20 Drawing Sheets

Related U.S. Application Data

(60) Provisional application No. 62/150,148, filed on Apr. 20, 2015.

(51) Int. Cl.
*B29K 23/00* (2006.01)
*B29K 105/00* (2006.01)

(58) Field of Classification Search
CPC ........ B29C 66/30325; B29C 66/91421; B29K 2277/00; B29K 2307/04; B29K 2309/08; B29K 2905/00; B29L 2031/283; B29L 2031/7543; B29L 2031/7546
See application file for complete search history.

(56) References Cited

U.S. PATENT DOCUMENTS

| | | |
|---|---|---|
| 2,241,645 A | 5/1941 | Peterson et al. |
| 2,728,299 A | 12/1955 | Johnson |
| 2,737,996 A | 3/1956 | Toth |
| 2,821,877 A | 2/1958 | Swanson |
| 2,999,529 A | 9/1961 | Rast |
| 3,326,304 A | 6/1967 | Johnson |
| 3,550,424 A | 12/1970 | Rast |
| 3,888,102 A | 6/1975 | Nigido |
| 3,940,227 A | 2/1976 | Strasser |
| 4,034,591 A | 7/1977 | Rothenberger |
| 4,050,285 A | 9/1977 | Bosch et al. |
| 4,107,249 A | 8/1978 | Murai et al. |
| 4,144,735 A | 3/1979 | Rothenberger |
| 4,154,083 A | 5/1979 | Rothenberger |
| 4,194,381 A | 3/1980 | Joekel |
| 4,206,603 A | 6/1980 | Mekler |
| 4,342,216 A | 8/1982 | Gregory |
| 4,425,783 A | 1/1984 | Rast |
| 4,604,890 A | 8/1986 | Martin |
| 4,689,857 A | 9/1987 | Gallentine |
| 4,706,343 A | 11/1987 | Neidigk |
| 4,733,551 A | 3/1988 | Bryant et al. |
| 4,735,078 A | 4/1988 | Wesebaum |
| 4,796,461 A | 1/1989 | Mead |
| 4,890,472 A | 1/1990 | Rothenberger |
| 4,942,757 A | 7/1990 | Pecora |
| 4,947,672 A | 8/1990 | Pecora et al. |
| 4,957,021 A | 9/1990 | Helton |
| 5,046,349 A | 9/1991 | Velte |
| 5,090,230 A | 2/1992 | Koskinen |
| 5,113,679 A | 5/1992 | Ferraro et al. |
| 5,150,644 A | 9/1992 | Kimura |
| 5,152,312 A | 10/1992 | Kogel |
| 5,195,042 A | 3/1993 | Ferraro et al. |
| 5,196,773 A | 3/1993 | Yoshikawa et al. |
| 5,243,845 A | 9/1993 | Velte |
| 5,282,378 A | 2/1994 | Kimura |
| 5,425,164 A | 6/1995 | El Dessouky |
| 5,553,478 A | 9/1996 | Di Troia |
| 5,727,442 A | 3/1998 | Wimmer |
| 5,744,085 A | 4/1998 | Sorberg |
| 5,782,128 A | 7/1998 | Barjesteh et al. |
| 6,446,482 B1 | 9/2002 | Heskey et al. |
| 6,510,719 B2 | 1/2003 | Goop |
| 6,510,723 B2 | 1/2003 | Amherd |
| 6,532,635 B1 | 3/2003 | Gregory |
| 6,662,621 B1 | 12/2003 | Amherd |
| 6,862,766 B2 | 3/2005 | Geurts |
| 7,065,995 B2 | 6/2006 | Frenken |
| 7,128,560 B2 | 10/2006 | Tandart |
| 7,159,290 B1 | 1/2007 | Liu |
| 7,250,753 B2 | 7/2007 | Terasaki |
| 7,325,346 B2 | 2/2008 | Chirnomas et al. |
| 7,337,514 B2 | 3/2008 | McKay |
| 7,409,828 B2 | 8/2008 | Bertleff |
| 7,421,877 B2 | 9/2008 | Frenken |
| 7,533,556 B2 | 5/2009 | Lefavour et al. |
| 7,557,568 B2 | 7/2009 | Terasaki |
| 7,568,372 B1 | 8/2009 | Patton et al. |
| 7,607,373 B2 | 10/2009 | Anderson |
| 7,908,693 B2 | 3/2011 | DeMoss |
| 8,056,473 B2 | 11/2011 | Frenken |
| 8,240,624 B2 | 8/2012 | Terasaki |
| 8,262,063 B2 | 9/2012 | Jacobs |
| 8,276,430 B2 | 10/2012 | Barezzani et al. |
| 8,303,295 B2 | 11/2012 | Gueit |
| 8,307,525 B2 | 11/2012 | Gregory |
| 8,307,690 B2 | 11/2012 | Cobzaru |
| 8,517,715 B2 | 8/2013 | Thorson et al. |
| 8,579,175 B2 | 11/2013 | Mina |
| 2001/0032490 A1 | 10/2001 | Goop |
| 2003/0005743 A1 | 1/2003 | Goop |
| 2006/0201228 A1 | 9/2006 | Rothenberger |
| 2007/0057393 A1 | 3/2007 | Hartmann et al. |
| 2008/0160130 A1 | 7/2008 | Gueit |
| 2008/0289457 A1 | 11/2008 | Anderson |
| 2012/0118136 A1 | 5/2012 | Heerdt et al. |
| 2013/0206022 A1 | 8/2013 | Bungter |
| 2014/0083085 A1 | 3/2014 | Awingler et al. |

FOREIGN PATENT DOCUMENTS

| | | |
|---|---|---|
| DE | 19963885 C1 | 5/2001 |
| DE | 202008002266 U1 | 4/2008 |
| DE | 102008061441 A1 | 7/2009 |
| EP | 0219268 A2 | 4/1987 |
| EP | 0397570 A1 | 11/1990 |
| EP | 0462719 A2 | 12/1991 |
| EP | 0567742 A2 | 11/1993 |
| EP | 0718057 A2 | 6/1996 |
| EP | 0878287 A1 | 11/1998 |
| EP | 1118401 A1 | 7/2001 |
| EP | 1938950 A1 | 7/2008 |
| EP | 2090384 A2 | 8/2009 |
| EP | 2090385 A2 | 8/2009 |
| EP | 2226182 A2 | 9/2010 |
| EP | 2258537 A1 | 12/2010 |
| EP | 2332716 A2 | 6/2011 |
| FR | 2451235 A1 | 10/1980 |
| FR | 264052 A1 | 10/1990 |
| FR | 2910828 A1 | 7/2008 |
| GB | 1485098 | 9/1977 |
| GB | 1524149 | 9/1978 |
| WO | 8800503 A1 | 1/1988 |
| WO | 0189736 A1 | 11/2001 |
| WO | 20090000966 A1 | 12/2008 |

PEX EXPANDING TOOL

The present application is a continuation of U.S. patent application Ser. No. 15/133,029, filed on Apr. 19, 2016, and entitled "PEX Expanding Tool," which claims priority to U.S. Provisional Pat. App. Ser. No. 62/150,148, filed on Apr. 20, 2015, and entitled "PEX Expanding Tool," which is incorporated entirely herein by reference as if fully set forth in this description.

BACKGROUND

The present disclosure relates to pipe and tubing expansion tools and methods. More particularly, the present disclosure relates to PEX (cross-linked polyethylene) expansion tools that utilize a multi-segment expansion head, and an auto-rotation feature. Specifically, the presently described expanding tool comprises an auto-rotation feature that takes place prior to head expansion.

Polymer tubing is gaining popularity in residential home and commercial building construction due to the rising cost of copper pipe. One of the more common types of polymer tubing is made from cross-linked polyethylene, commonly known as PEX. Polymer tubing is connected to a joint by expanding the mouth of the tubing, thus allowing the tubing to slip over the joint. The tubing is then secured to the joint by crimping the expanded part of the tubing. A typical building will have many joints; hence installation of the tubing involves expanding the mouths of numerous tubes.

SUMMARY

The present disclosure describes implementations that relate to a PEX expanding tool. In one embodiment the disclosure describes a tool operable to expand an end of a pipe. Such a tool may comprise an actuator and an expander head operably coupled to the actuator the expander head comprising a plurality of expander head segments. When triggered, the actuator first rotates the expander head and then the actuator expands the expander head segments within the expander head.

In an example implementation, the present disclosure describes an expanding tool. The expanding tool includes: (i) an actuator comprising a cylindrical housing that defines an actuator housing cavity; (ii) a primary ram disposed within the actuator housing cavity, the primary ram defining an internal primary ram cavity; (iii) a secondary ram disposed within the internal primary ram cavity; (iv) a cam roller carrier coupled to a distal end of the secondary ram; (v) a drive collar positioned within a distal end of the actuator housing cavity; (vi) a roller clutch disposed within an internal cavity defined by an inner surface of the drive collar; (vii) a shuttle cam positioned between the roller clutch and a distal end of the primary ram; (viii) an expander cone coupled to the primary ram, and (ix) an expander head operably coupled to the drive collar. When the expanding tool is triggered, the secondary ram moves in a distal direction causing the cam roller to move, causing the shuttle cam and the drive collar to rotate about the primary ram. As the drive collar rotates, the expander head rotates a predetermined rotation amount.

The features, functions, and advantages can be achieved independently in various embodiments of the present disclosure or may be combined in yet other embodiments in which further details can be seen with reference to the following description and drawings.

DETAILED DESCRIPTION

Figure 1:
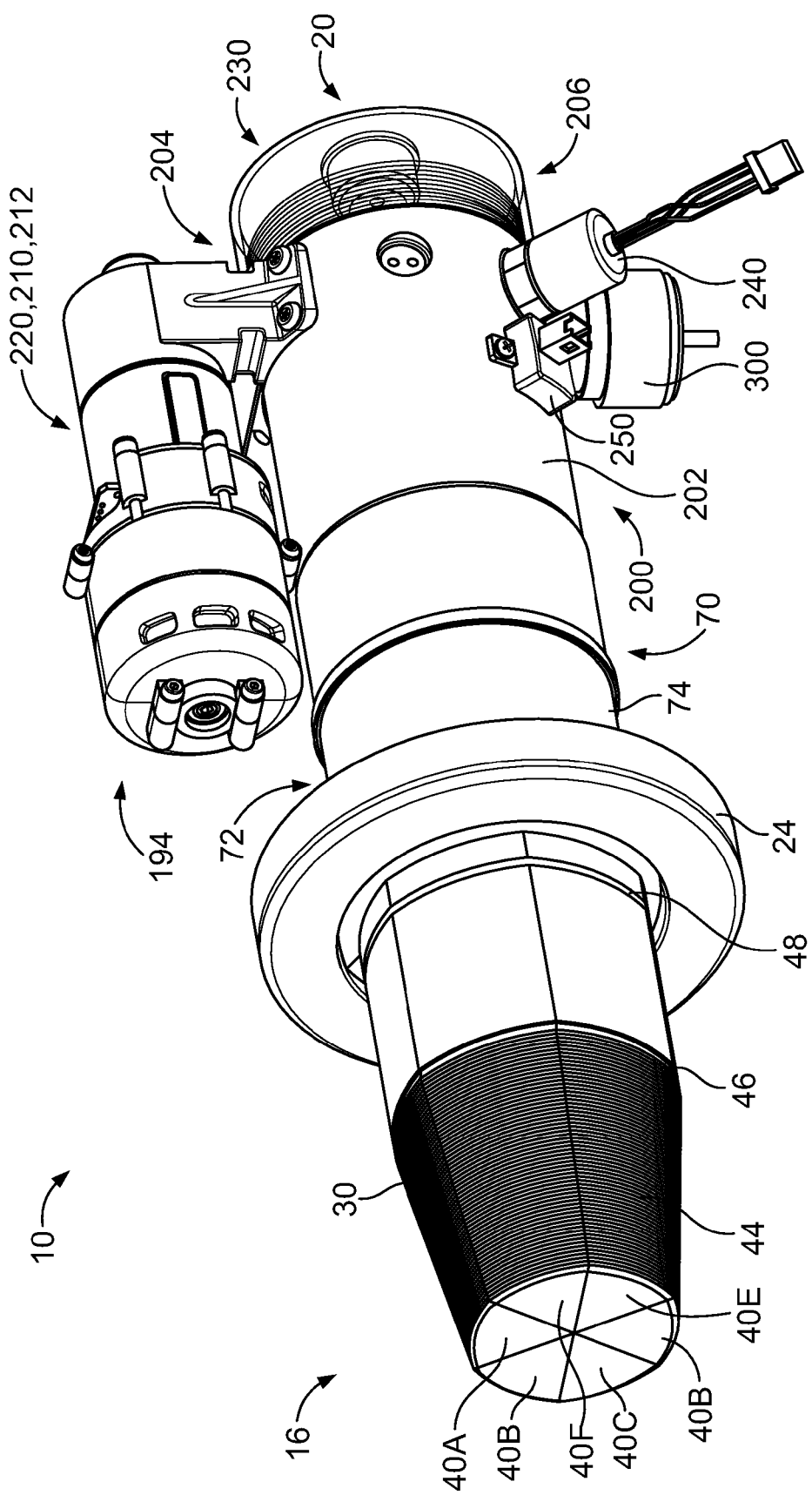
FIG. 1 is a perspective view of various component parts of an expanding tool.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1 is a perspective view of various component parts of an expander tool 10. As illustrated, the expander tool 10 comprises a work end 16 and a back end 20. The work end 16 which may also be termed a distal end of the expander tool 10 preferably comprises an expander head 30 that is operably coupled to an actuator 70. The expander head 30 comprising a plurality of expander head segments 40AF. The actuator 70 comprises a generally cylindrical housing 74 that is operatively coupled to a cylinder body 200. As will be described in greater detail herein, the actuator 70 comprises a number of working components that function together so as to first rotate and then expand the expander head segments 40A-F within the expander head 30. Mounted to a back end or a proximal end 20 of the cylinder body 200 is a fluid reservoir 230. The fluid reservoir 230 holds the hydraulic fluid for operating the gearcase and pump drive. In one preferred arrangement, the fluid reservoir 230 comprises a flexible fluid reservoir.

In FIG. 1, a number of components are illustrated as being mounted to an outer surface 202 of the cylinder body 200. For example, near a top portion 204 of the cylinder body 200, a gear case 220, a pump drive 212, and pump 210 are directly coupled to the outer surface of the cylinder body 200. The pump drive 212 operates the pump 210. Operatively coupled to the gear case 220, the pump drive 212, and the pump 210 combination is a motor 194. Also operatively coupled to a bottom portion 206 of the outer surface 202 of the cylinder body 200 is a pressure sensor 240, a pilot valve solenoid 300, and a position sensor 250, the form and function of which will be described in greater detial herein.

Figure 2:
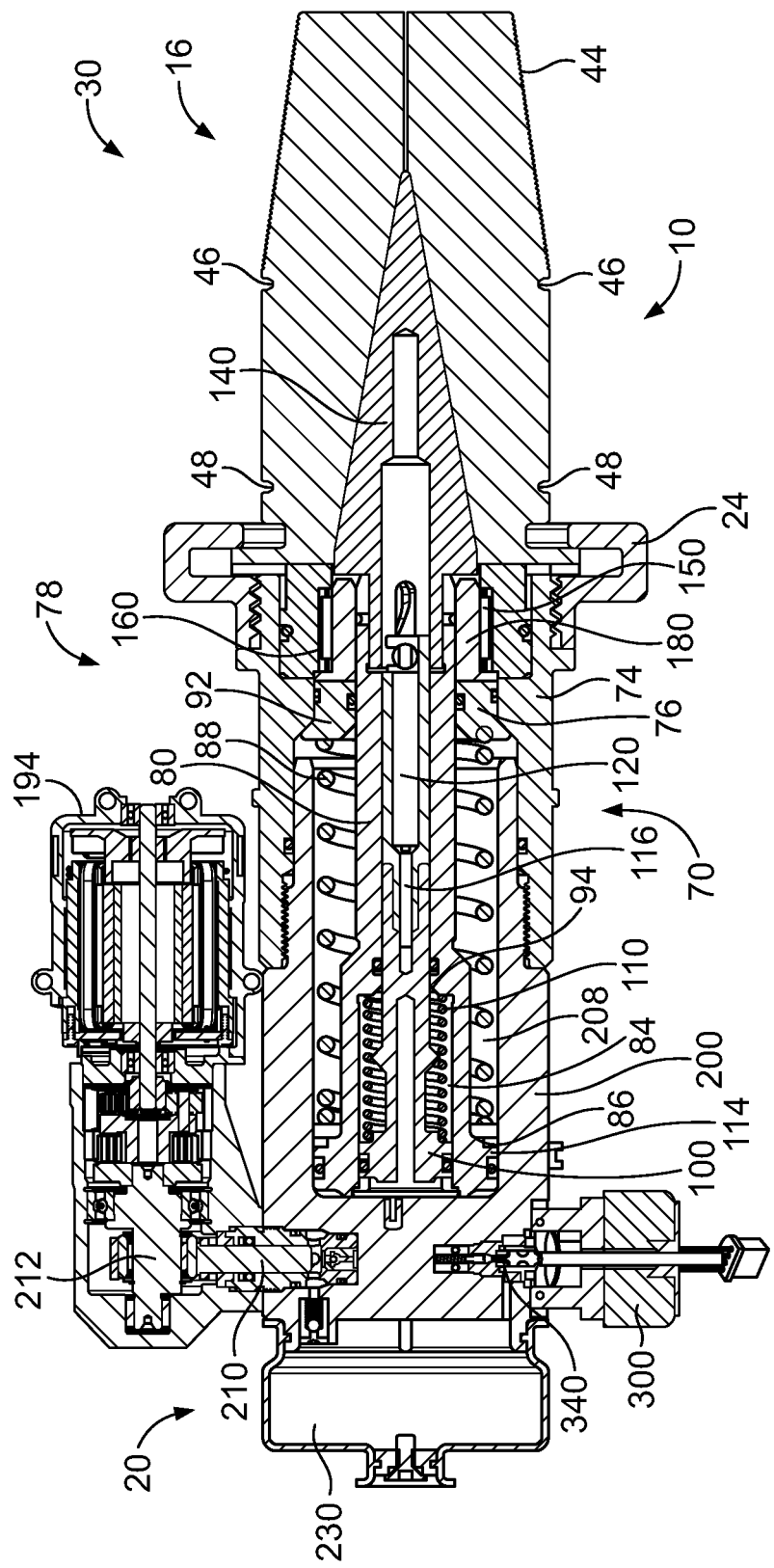
FIG. 2 is a cross sectional view of the various components of the expanding tool illustrated in FIG. 1.

FIG. 2 is a cross sectional view of the various components of the expanding tool 10 illustrated in FIG. 1. Specifically, FIG. 2 shows the expanding tool 10 (and its various component parts) in a home position, that is, the position that the expanding tool 10 remains in when it is not being operated.

FIG. 2 illustrates a cross sectional view of the motor 194, the gear case 220, the pump 210, the fluid reservoir 230, the cylinder body 200, the actuator 70, and the expander head 30 of the expander tool 10 illustrated in FIG. 1. As can be seen from FIG. 2, the actuator 70 comprises a number of components that operate the expander head 30 under hydraulic control and operation of the pump 210. Specifically, in this example arrangement, the cylinder body 200 is threadedly coupled to the actuator housing 74. The cylinder body 200 defines a cylinder body cavity 208 and the actuator housing 74 defines an actuator housing cavity 76. Together, the cylinder body cavity 208 and the actuator housing cavity 76 contain the various components that operate together so as to first rotate the expander head 30 a predetermined amount. Then, after the expander head 30 has been rotated a predetermined amount, these various component parts drive an expander cone 140 into the expander head 30 so as to expand the expander head segements 40A-F of the expander head 30 radially outwardly.

The cylinder body cavity 208 and the actuator housing cavity 76 house a primary ram 80, a primary ram return spring 88, a secondary ram 100, a cam roller carrier 120, a primary ram hard-stop collar 92, a shuttle cam 180, a drive collar 160, and a roller clutch 150. The primary ram 80 comprises a distal end located near the expander head 30 and a proximal end located near the fluid reservoir 230. At the proximal end of the primary ram 80, a primary ram flange 86 is provided. In addition, the primary ram return spring 88 is provided along an external surface of the primary ram 80, between the primary ram flange 86 and proximal or back face of the primary ram hard-stop collar 92.

As illustrated, with the expanding tool in the home position, the primary ram return spring 88 resides in a non-compressed state. The primary ram 80 further defines a primary ram cavity 84 and within this primary ram cavity 84 a secondary ram 100 is provided. Similar to the primary ram 80, the secondary ram 100 comprises a distal end directed towards the expander head 30 and a proximal end generally directed towards the fluid reservoir 230. At the proximal end of the secondary ram 100, a secondary ram flange 114 is provided. A secondary ram return spring 110 is provided along an external surface of the secondary ram 100, between the secondary ram flange 114 and an internal primary ram hard stop 94. As illustrated in FIG. 2, with the expanding tool 10 residing in the home position, the secondary ram return spring 110 also resides in a non-compressed state.

Operatively coupled to the distal end of the secondary ram 100 is the cam roller carrier 120. In one examplery arrangment, a pin or screw 116 may operatively couple the secondary ram 100 to the cam roller carrier 120. In this home position, the cam roller carrier 120 resides within the distal portion of the secondary ram 100 and also within a distal portion of the primary ram cavity 84. A distal portion of the cam roller carrier 120 extends into a proximal end of the expander cone 140.

Figure 3:
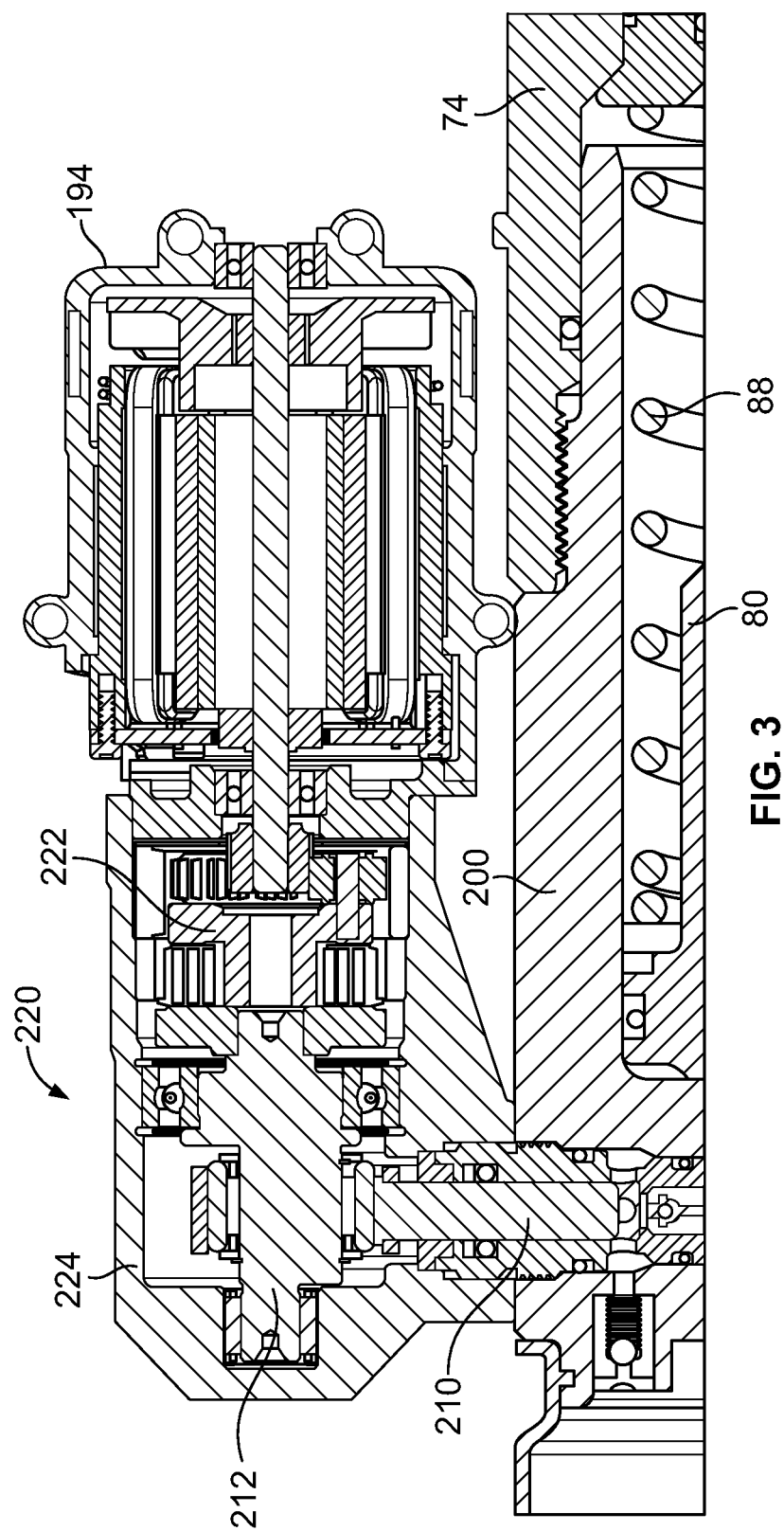
FIG. 3 is a close up view of the motor, the gearcase, and the pump drive of the expanding tool illustrated in FIG. 1.

FIG. 3 is a close up view of the motor 194, the gearcase 220, the pump 210, and the pump drive 212 of the expanding tool 10 illustrated in FIGS. 1 and 2. As illustrated in FIG. 3, the motor 194 is operatively coupled to a gear housing 224 and this gear housing 224 houses both a gearset 222 and the pump drive 212. In one preferred arrangment, the motor 194 comprises a clamshell motor and the gearset 222 comprises a two-stage planetary gearset. In one example arrangement, the planetary gearset provides for a 10.6:1 reduction.

Figure 4:
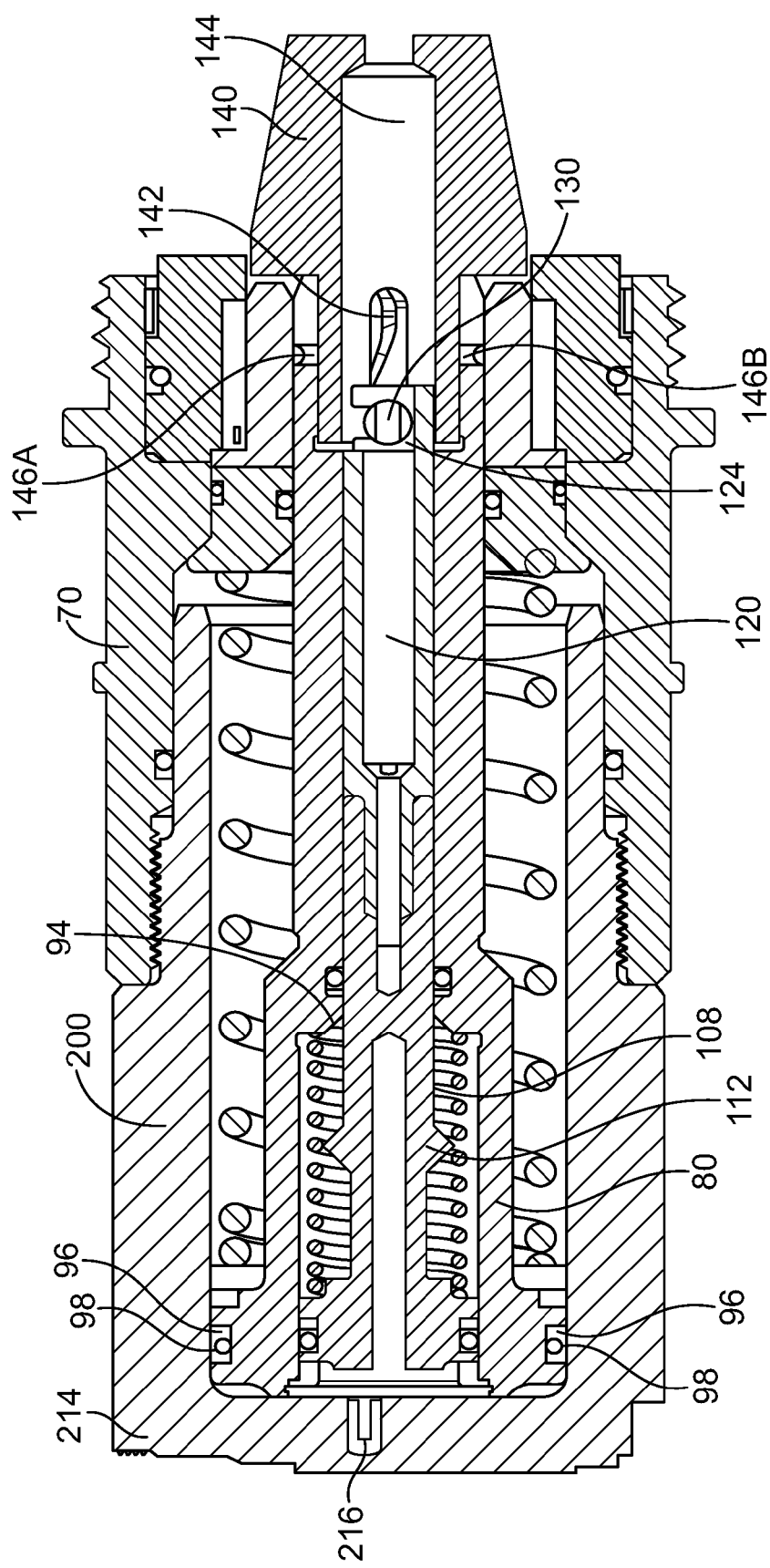
FIG. 4 is a close-up view of the actuator of the expanding tool illustrated in FIG. 1.

FIG. 4 is a close-up view of the cylinder body 200 and the actuator 70 of the expanding tool 10 illustrated in FIG. 1. Prefereably, the cylinder body 200 comprises an aluminim body comprising a roller-burnished inner cavity. A cap side 214 of the cylinder body 200 may be configured to operate as a fluid reservoir and may be in fluid communication with the rear fluid reservoir 230 by way of at least one longitudinal fluid passage 216.

The secondary ram 100, positioned within the primary ram cavity 84 is coupled to the cam roller carrier 120. The cam roller carrier 120 is generally cylindrical in shape and comprises a cam roller 130 at a distal end 124 of the cam roller carrier 120. This cam roller 130 is positioned within a slot 142 provided within the expander cone 140 as the cam roller carrier 120 moves distally and proximally within an expander cone cavity 144.

The primary ram 80 further comprises a groove 96 along the outer surface of the primary ram, located near the proximal end of the primary ram 80. In one preferred arrangement, a magnetic ring 98 is provided witin this groove 96. As will be discussed in greater detail herein, the magnetic ring 98 allows an end of stroke detection circuit component (e.g., a position sensor 250) of the expanding tool 10 to detect when the primary ram 80 reaches a fully retracted position as illustrated in FIG. 4.

In this illustrated arrangment, the secondary ram 100 further comprises a secondary ram hard stop 112 that is configured as a ridge and provided along an outer surface 108 of the secondary ram 100. As will be described in greater detail herein, the secondary ram hard stop 112 is configured to bear against the internal primary ram hard stop 94 after the expander head 30 has been rotated but before expansion of the expander head 30 is initiated.

In this illustrated arrangement, two set screws 146A, B may be used to affix the expander cone 140 to the distal end of the primary ram 80.

Figure 5:
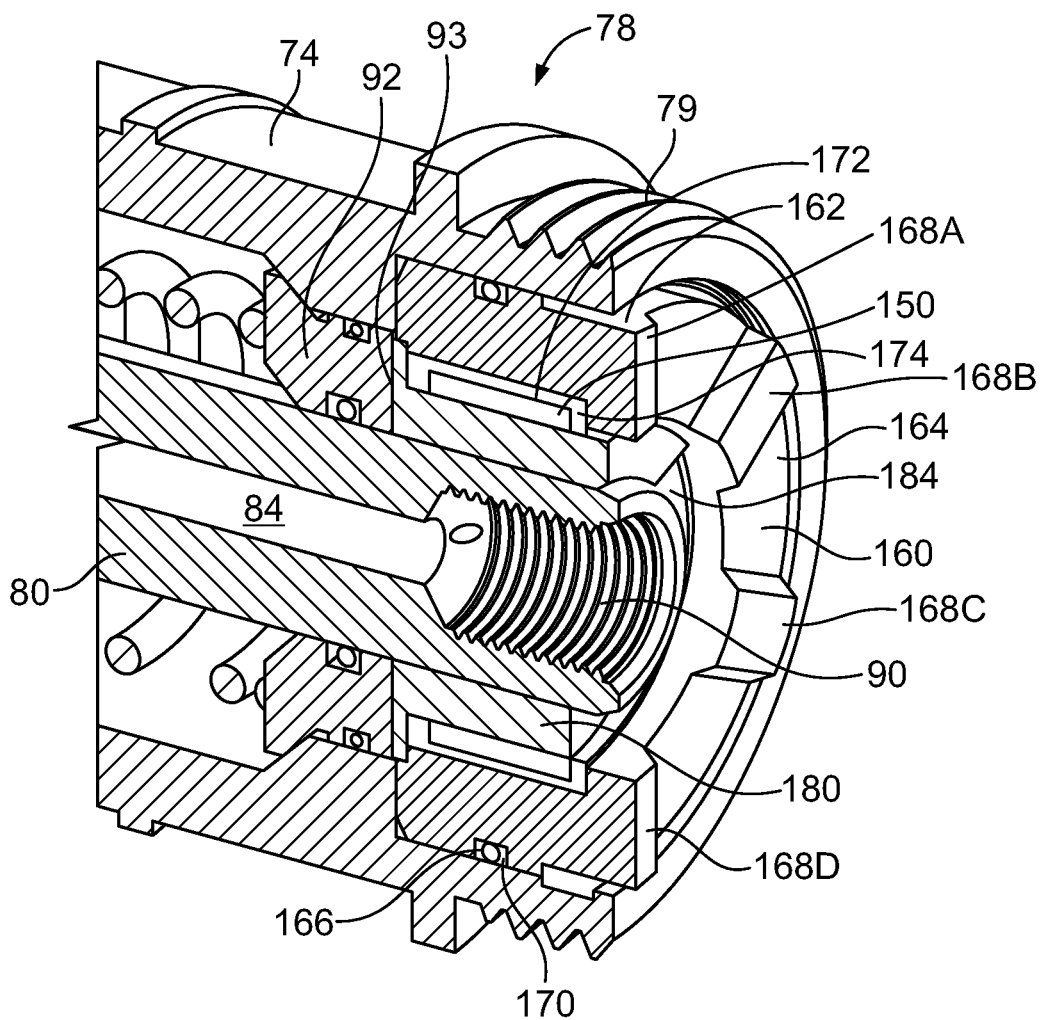
FIG. 5 is a close-up view of various components of the actuator illustrated in FIG. 4.

FIG. 5 is a close-up view of various components of the actuator illustrated in FIG. 4. Specifically, FIG. 5 is a close-up view of the various components of the actuator 70 that act togethers so as to first rotate and then expand the expander head 30. Specifically, FIG. 5 is a close up view of the drive collar 160, the roller clutch 150, the shuttle cam 180, and the distal end of the primary ram 80.

For example, FIG. 5 illustrates the drive collar 160 as being positioned within a distal end 78 of the actuator housing 74. As illustrated, the distal end 78 of the actuator housing 74 may be provided with an external thread 79 for threadedly engaging a cap 24 (shown in FIGS. 1 and 2) so as to affix the expander head 30 to the actuator 70. For example, reference is made FIGS. 1 and 2 illustrating the cap 24 in threaded angagement with the distal end 78 of the actuator housing 74 so as to affix the expander head 30 to the expanding tool 10.

The drive collar 160 comprises a first engaging face 164 directed in a distal direction, i.e., towards the expanding head 30. This first engaging face comprising a plurality of lugs 168 A,B,C,D that are geometrically configured to match slots provided in the expander head segments 40 A,B,C,D,E making up the expander head 30. As such, when the drive collar 160 is rotated prior to expansion of the expander head 30, the plurality of lugs 168A-D transmit torque to the expander head 30, therby rotating the expander head 30. In one preferred arrangement, the plurality of lugs 168A-D comprise a trapezoidal geometrical configuration.

Seated or pressed within an internal cavity 174 defined within an inner surface 172 of the drive collar 160 is the roller clutch 150. The roller clutch 150 allows drive collar 160 to freewheel on shuttle cam 180 when the primary ram 80 is extended in the distal direction. In addition, the roller clutch 150 also transmits torque during retraction of the primary ram 80 in the proximal direction, back towards the home position.

As illustrated in FIG. 5, a groove 170 may be provided along an outer surface 162 of the drive collar 160. Preferably, an o-ring 166 may be provided in this groove 170 so as to generate enough friction so as to prevent the drive collar 160 from freewheeling on the roller clutch 150. In one preferred arrangement, this o-ring 166 comprises a nitrile butadiene rubber o-ring.

The shuttle cam 180 is positioned between the roller clutch 150 and the distal end of the the primary ram 80 and seated along a distal or front face 93 of the primary ram hard-stop collar 92. Specifically, the shuttle cam 180 rotates around the primary ram 80. A follower bearing that is attached to the primary ram 80 drives the shuttle cam 180. Extension of the primary ram 80 in the distal direction "resets" the shuttle cam 180 while retraction of the primary ram 80 in the proximal direction "drives" the shuttle cam 180. In one preferred arrangement, the shuttle cam 180 provides for an approximately 18 degree rotation of the expander head 30 for each stroke of the primary ram 80. However, as those of ordinary skill will recognize, alternative predetermined rotational configurations may also be used.

Positioned within an internal cavity 184 defined by the shuttle cam 180 is the primary ram 80. As noted, the primary ram cavity 84 ends near a distal portion of the primary ram 80 and has a greater diameter at that end than the remainder of the primary ram cavity. At this larger diameter cavity, an internal thread 90 is provided. This internal thread 90 may be utilized to securely affix the expander cone 140 to the primary ram 80.

Figure 6:
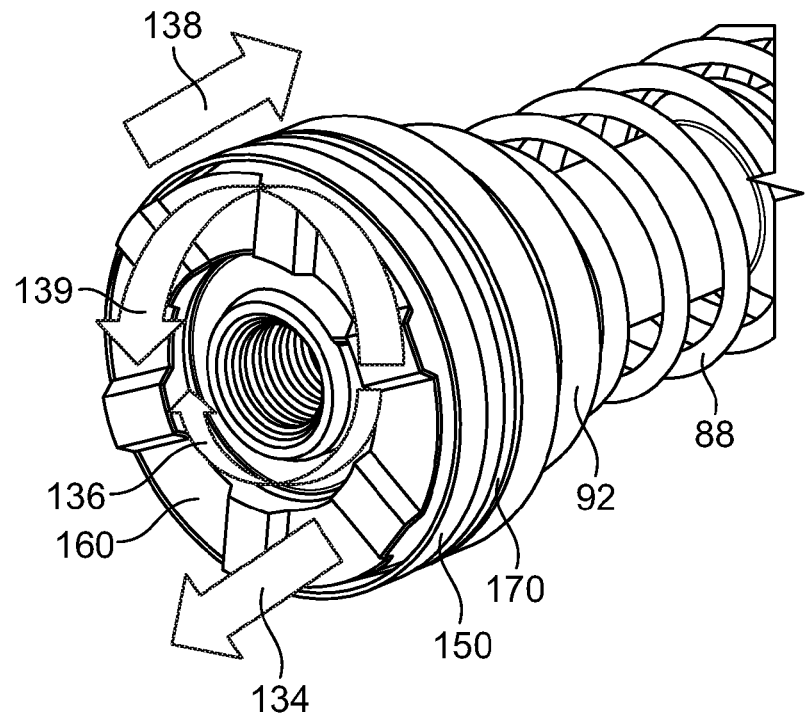
FIG. 6 is a close-up view of the shuttle cam illustrated in FIG. 5.
Figure 7:
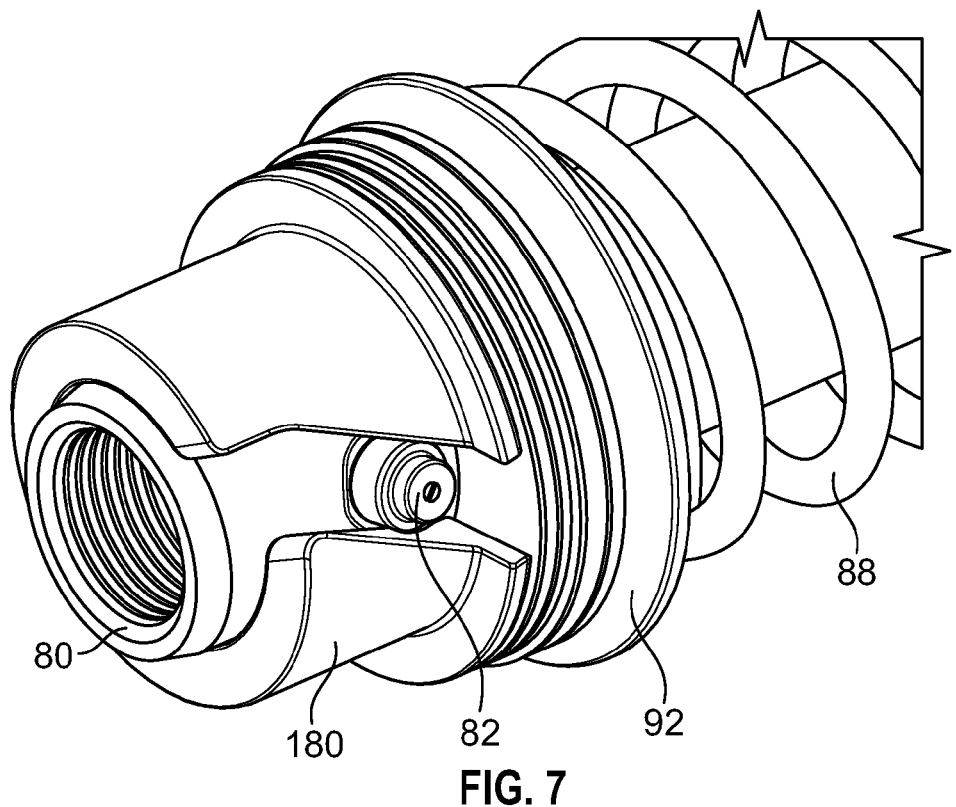
FIG. 7 is close-up view of the shuttle cam illustrated in FIG. 5.

FIG. 6 is a close-up view of the drive collar 160 illustrated in FIG. 5. And FIG. 7 is close-up view of the shuttle cam 180 illustrated in FIG. 5. Specifically, FIG. 7 illustrates a follower bearing 82 of the primary ram 80 pulling through the shuttle cam 180 to rotate the expander head 30 during primary ram retraction.

As noted from FIGS. 6 and 7, when the primary ram 80 is transmitted in the distal direction represented by arrow 134, the shuttle cam 180 and hence the drive collar 160 rotate in the clockwise direction as illustrated by arrow 136. Similarly, when the primary ram 80 is retracted in the proximal direction represented by arrow 138, the shuttle cam 180 but not the drive collar 160 will be rotated in the counter clockwise direction represented by arrow 139.

Figure 8:
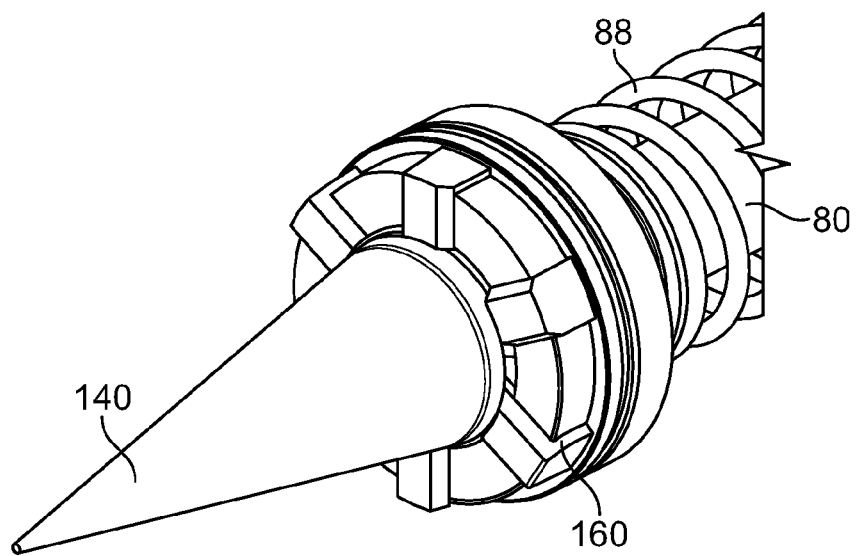
FIG. 8 is a close-up view of the drive collar of the actuator illustrated in FIG. 4.
Figure 9:
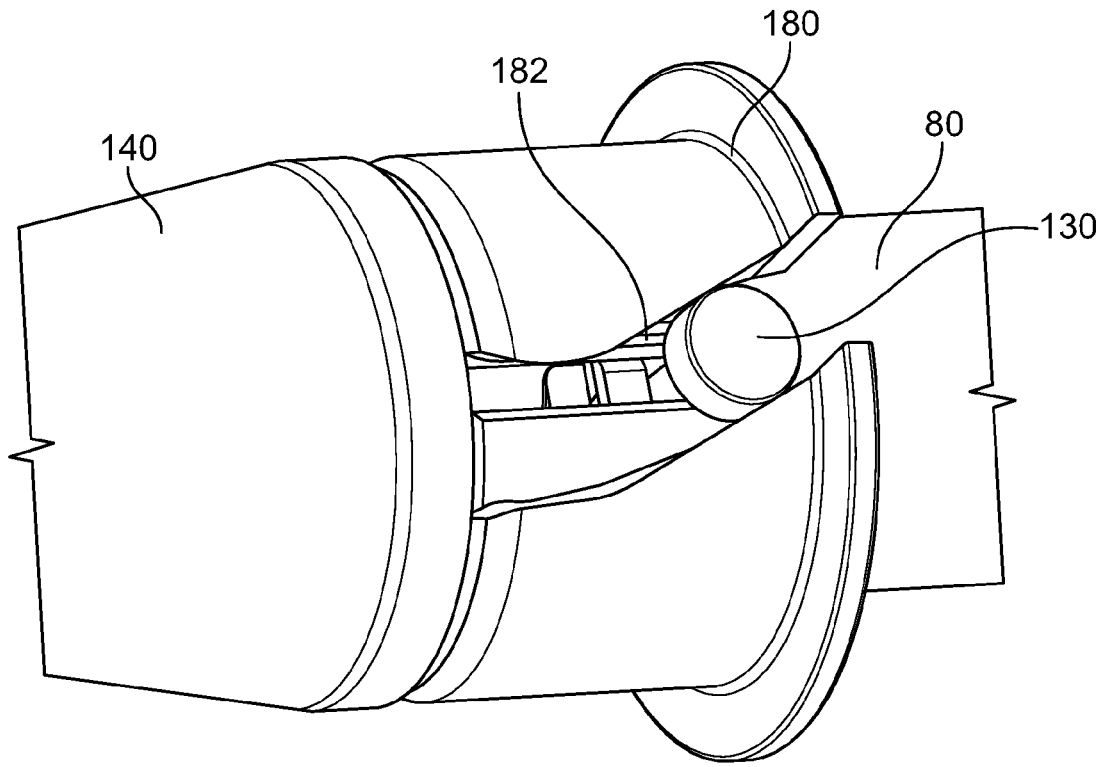
FIG. 9 is another close-up view of the shuttle cam of the actuator illustrated in FIG. 8.

FIG. 8 is a close-up view of the drive collar 160 of the actuator 70 illustrated in FIG. 4 and FIG. 9 is another close-up view of the shuttle cam 180 of the actuator 70 illustrated in FIG. 7. As illustrated, the cam or slanted or non-axial groove 182 on the shuttle cam 180 is flipped to rotate on primary ram 80 advance where the bearing is replaced with a cam roller 130 that is driven by the secondary ram 100. As noted in FIG. 9, the expander cone 140 is keyed to the primary ram 80 by way of the cam roller 130 and preferably via two setscrews 146A, B (see, FIG. 4).

Figure 10:
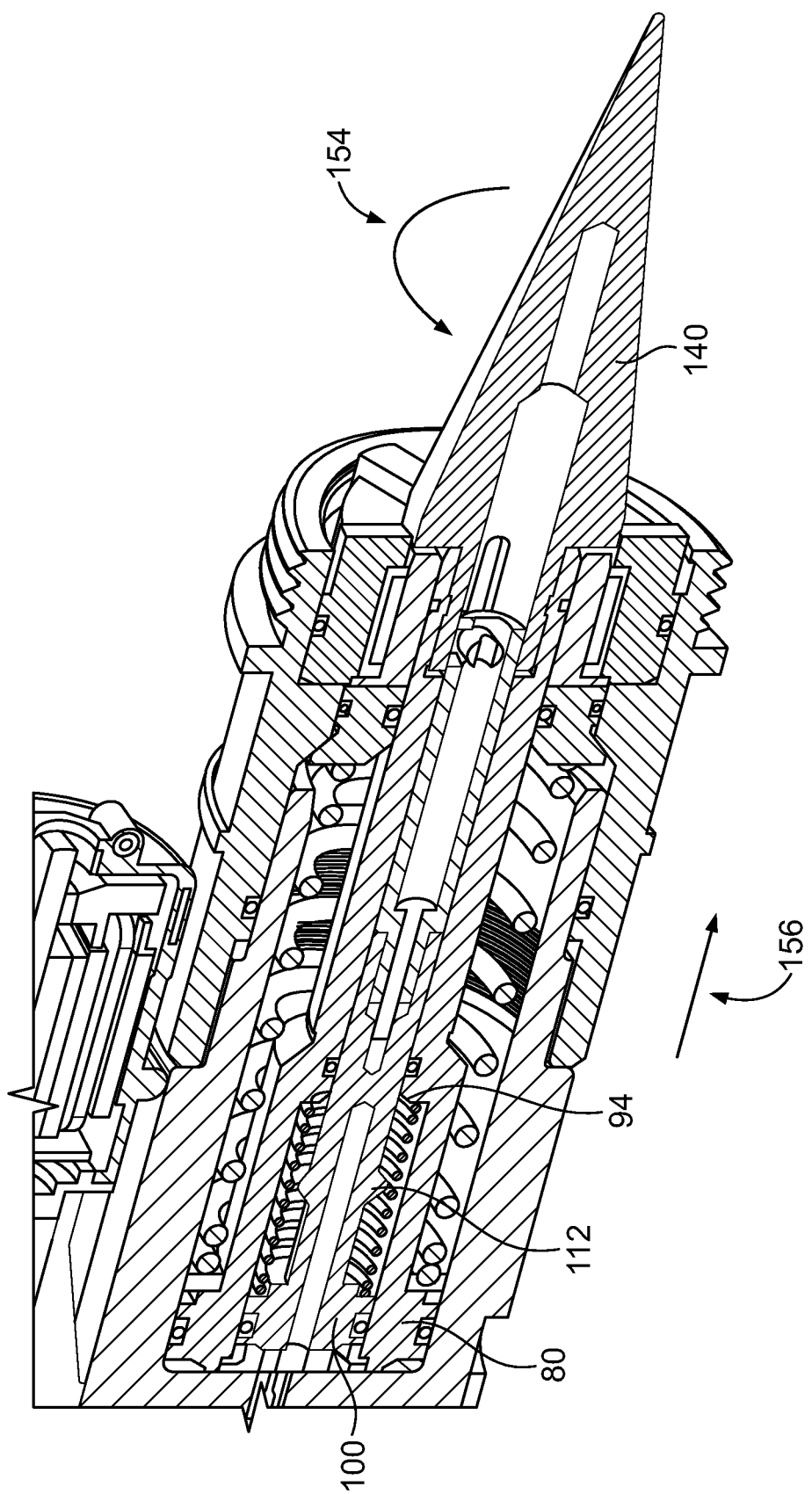
FIG. 10 is a perspective view of the actuator illustrated in FIG. 9 prior to expander head rotation.
Figure 11:
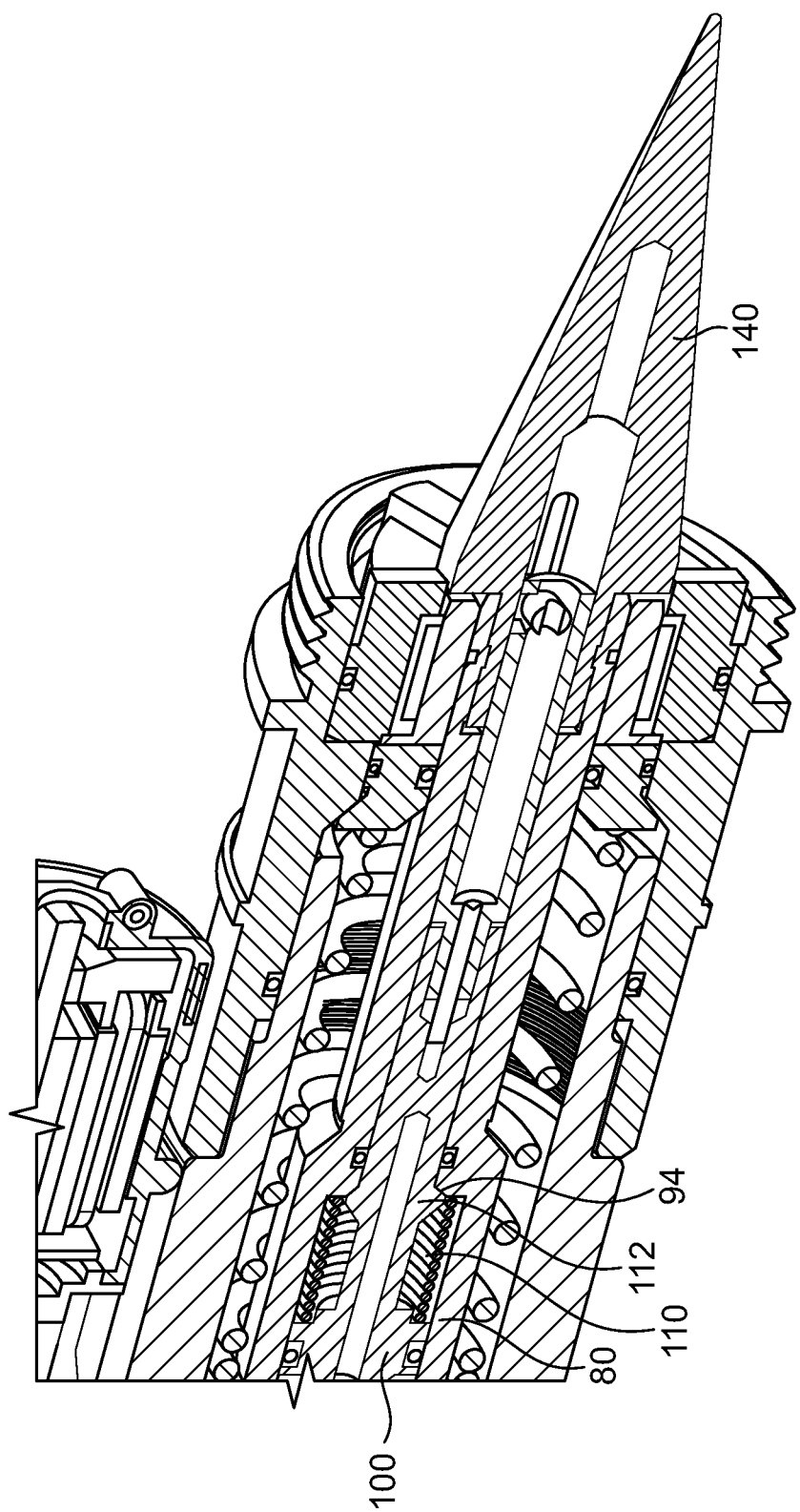
FIG. 11 is another perspective view of the actuator illustrated in FIG. 10 after expander head rotation and prior to expander head expansion.

FIG. 10 is a perspective view of the actuator 70 illustrated in FIG. 9 prior to rotation of expander head 30. As illustrated by arrow 156, the secondary ram 100 begins to move in the distal direction until the secondary ram hard stop 112 engages the primary ram internal hard stop 94. As the secondary ram 100 proceedes in the distal direction, the drive collar 160 (and hence the expander head 30 (not shown)) are rotated in the counterclockwise direction as noted by arrow 154. Once the secondary ram hard stop 112 engages the primary ram internal hard stop 94, expander head 30 rotation is complete and expansion of the expander head segments 40A-F making up the expander head 30 is initiated. This is illustrated in FIG. 11. For example, FIG. 11 is a perspective view of the actuator 70 illustrated in FIG. 10 after expander head 30 rotation and prior to expander head 30 expansion. As illustrated in FIG. 11, the secondary ram hard stop 112 of the secondary ram 100 has engaged the primary ram internal hard stop 94, and now, both the primary ram 80 and the secondary ram 100 will be driven in the distal direction. In this position, the secondary ram return spring 110 resides in a compressed state. Together, the primary ram 80 and the secondary ram 100 drive the expander cone 140 towards the expander head 30 so as to radially expand the expander head 30 once rotation is complete.

Figure 12:
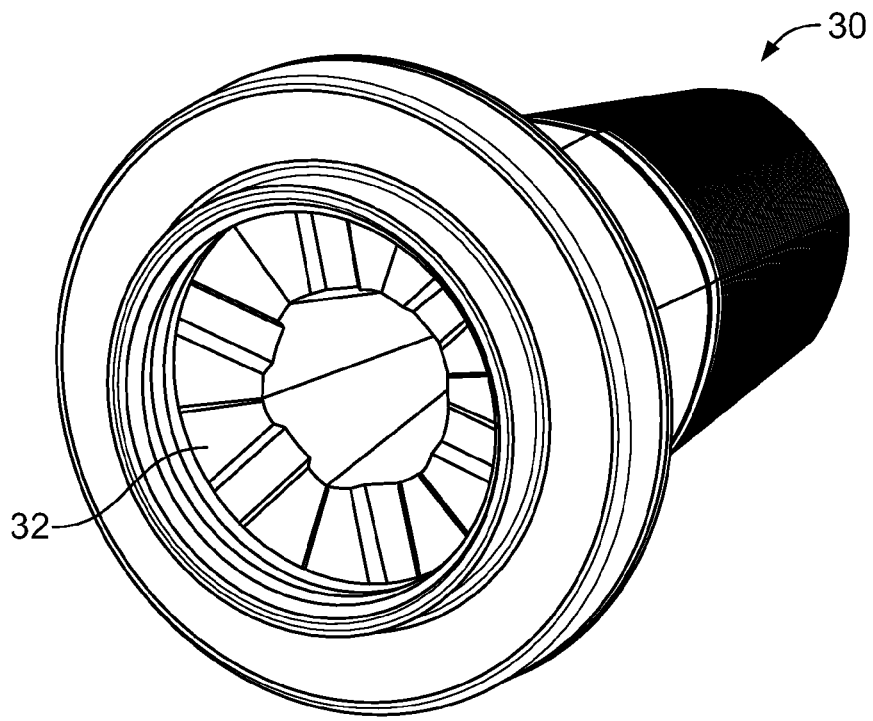
FIG. 12 is a perspective view of the expander head of the expander tool illustrated in FIG. 1.
Figure 13:
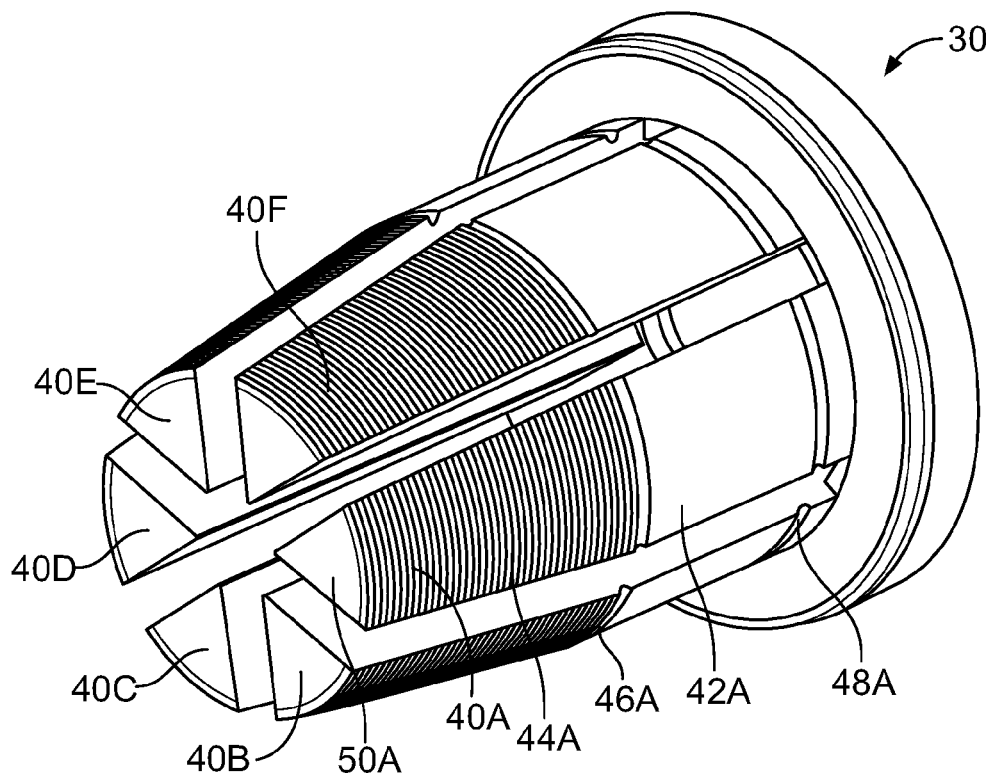
FIG. 13 is another perspective view of the expander head illustrated in FIG. 12.

FIG. 12 is a perspective view of the expander head 30 for use with an expander tool, such as the expander tool 10 illustrated in FIG. 1. In this illustrated position, the expander head segments 40A-F making up the expander head 30 reside in a closed position. FIG. 13 is another perspective view of the expander head 30 illustrated in FIG. 12. In FIG. 13, the expander head segments 40A-F making up the expander head 30 reside in a partially expanded state.

As can be seen from FIG. 12, the expander head 30 comprises a plurality of expander head segments 40A-F. In this illustrated arrangement, the expander head comprises six expander head segments. However, alternative configurations may also be used.

The expanding tool 10 is configured so that it rotates a predermined amount prior to each expansion, the predetermined amount being the amount of rotation needed to move the expanding head segments 40A-F from a tube mouth portion that is stretched to a tube mouth portion that is unstretched. More specifically, the rotation of the expanding head segments 40A-F is at least partially determined by the number of expanding head segments within the expander head 30. The number of expanding head segments is selected to allow for multiple rotations without repeating the position of the expander head 30. As just one example, in one expander tool arrangement, six expanding head segments 40A-F are employed with each expanding head segment covering an arc length of 60 degrees. In one preferred expanding tool arrangement, the expanding tool 10 is configured to rotate the expanding head segments 40A-F 18 degrees with each rotation such that 20 rotations are required before an original expander head 30 position is repeated.

As can be seen from FIG. 12, each expander head segment 40A-F making up the expander head 30 comprises a bottom surface wherein this bottom surface comprises a plurality of grooves 32. In a preferred arrangement, these grooves 32 comprise a plurality of trapezoidal grooves that are geometrically configured to match the plurality of lugs 168 provided on the drive collar engaging face 164 of the drive collar 160 (see, FIGS. 5 and 6). As such, when the drive collar 160 is activated in the clockwise direction during ram extension, the expander head 30 while engaged to the drive collar 160 is also rotated a predetermined amount prior to expander head 30 expansion. These trapezoidal grooves 32 also help guide movement of the expander head segments 40A-F in the radial direction for an even expansion during head expansion.

As may be seen from FIG. 13, each of the six head segments 40A-F comprises an outer surface. As just one example, expander head segment 40A comprises an outer surface 42. As illustrated, an outer surface 42A of the head segment 40A comprises a number of features. For example, the outer surface 42A of the expander head segment 40A comprises plurality of ribs 44A provided near a distal end 50A of the expander head segment 40A. In addition, this outer surface 42A of the expander head segment 40A further comprise a first distal groove 46A and a second proximal groove 48A. In a preferred arrangement, each of the remaining expander head elements 40B-F of expander head 30 comprise similar rib and groove arrangements. The ribs 44A are formed near a frustoconical end of the expander head segments 40A-F and provide a higher frictional force during pipe expansion. The first and second groove arrangements 46A and 48A may be used with o-rings for enabling segment return after head expansion. (see, first groove arrangement 46 and second groove arrangement 48 in FIG. 1). In other arrangements, a garter spring may also be used for enabling expander head segment return after the expander head has been expanded. In a preferred arrangement, each of the remaining expander head elements 40B-F of expander head 30 comprises similar first and second groove arrangements.

Figure 14B:
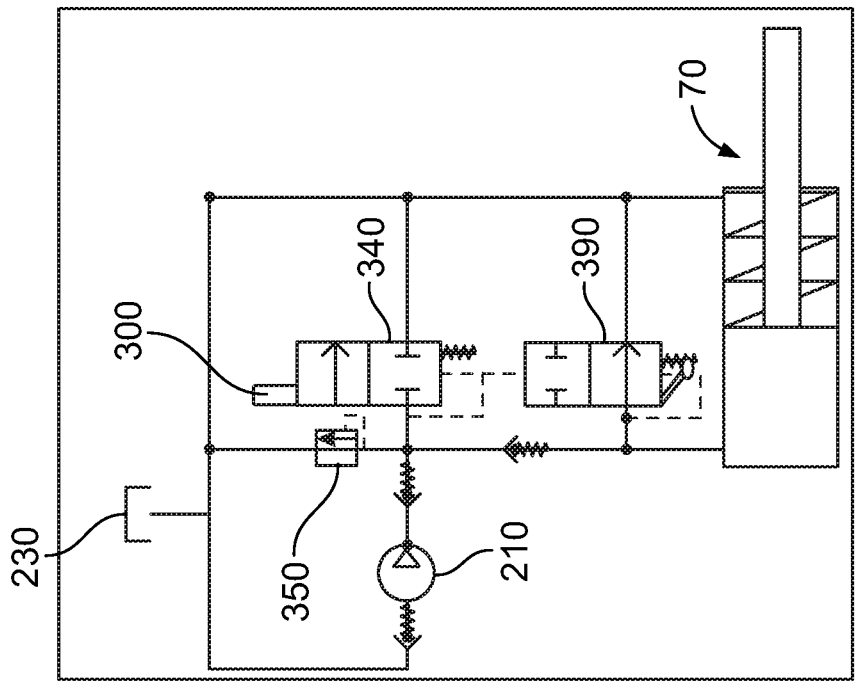
FIG. 14B is a schematic representaion of dump valve circuit components illustrated in FIG. 14A.
Figure 14A:
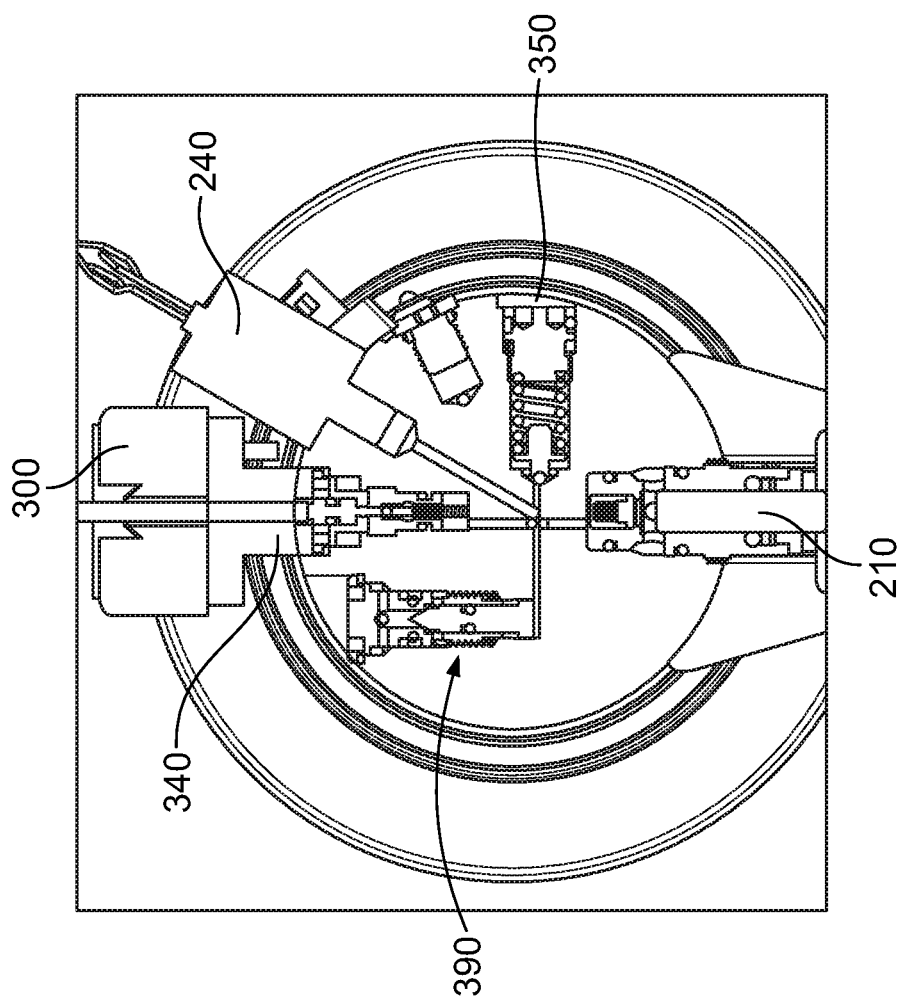
FIG. 14A is a perspective view of dump valve circuit components that may be used with an expanding tool, such as the expanding tool illustrated in FIG. 1.

FIG. 14A is a perspective view of a pump and valve system that may be used with an expanding tool, such as the expanding tool illustrated in FIG. 1. As illustrated, this pump and valve system comprises a solenoid 300, a pilot valve 340, a relief valve 350, the pump 210, and the primary valve 390. FIG. 14B is a schematic view of the pump and valve system illustrated in FIG. 14A with like elements designated with like reference numbers.

Figure 16:
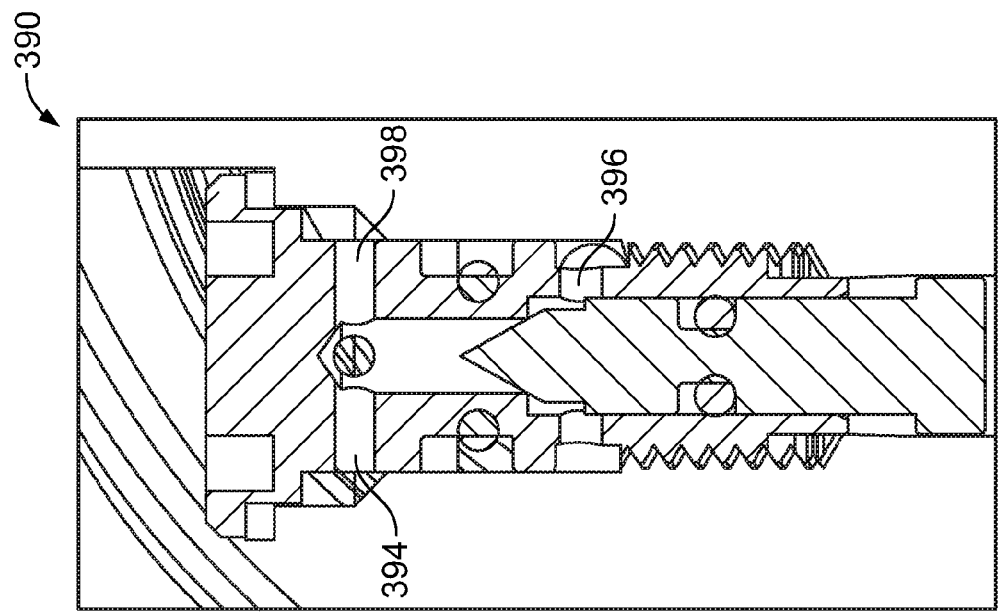
FIG. 16 is a cross-sectional view of the primary dump valve of the expanding tool illustrated in FIGS. 14A and 14B.
Figure 15:
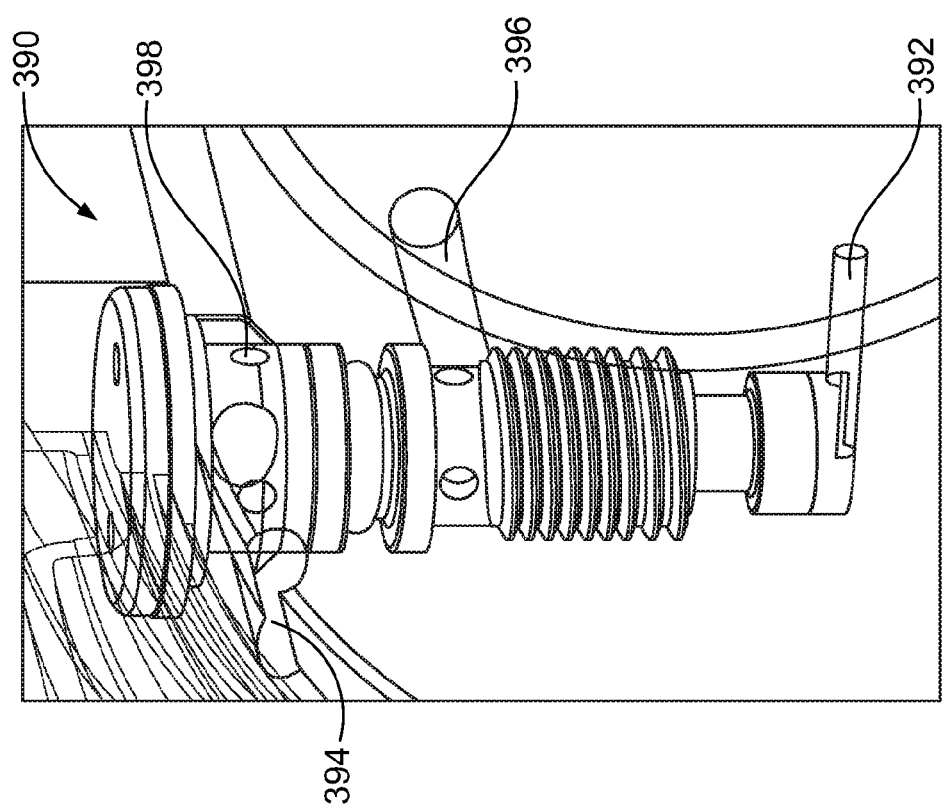
FIG. 15 is a close up view of the primary dump valve of the dump valve circuit illustrated in FIGS. 14A and 14B.

In addition, FIG. 15 illustrates a perspective view of the primary valve 390 illustrated in FIGS. 14A and 14B and FIG. 16 is a cross-sectional view of the primary valve 390 of the expanding tool illustrated in FIGS. 14A and 14B. As noted in FIG. 15, the primary valve 390 comprises a port or path configuration for controlling fluid flow from and back into the fluid reservoir 230. Specifically, the primary valve 390 comprises a port or path 392 to the fluid reservoir 230, a port or path 394 to the cylindrical cap, another port or path 396 to the cylinder, and a port or path 398 to the pump 210.

Referring now to FIGS. 14A-B, 15 and 16, during an expansion sequence, as the primary ram 80 and the secondary ram 100 continue to extend in a distal direction, pressure will build inside the actuator 70. During the expansion sequence, as the primary ram 80 reaches the primary ram hard-stop collar 92, the pressure within the cylinder body 200 reaches a predetermined transducer setpoint. The pressure sensor 240 will monitor the pressure within the cylinder body 200. Once the predetermined transducer setpoint is reached, the motor 194 will be deactivated. When this setpoint is reached, the valve solenoid 300 is pulsed and this will open the pilot dump valve 340 to the fluid reservoir 230. Opening up the pilot dump valve 340 also reduces the pressure on the primary valve 390, thereby causing the primary valve 390 to shift states. As fluid from the cylinder body 200 flows through the pilot dump valve 340 back into the fluid reservoir 230, this will reduce the pressure within the cylinder body 200 and as this internal pressure drops, this will allow the primary ram return spring 88 to force the primary dump valve 390 to close.

Figure 17:
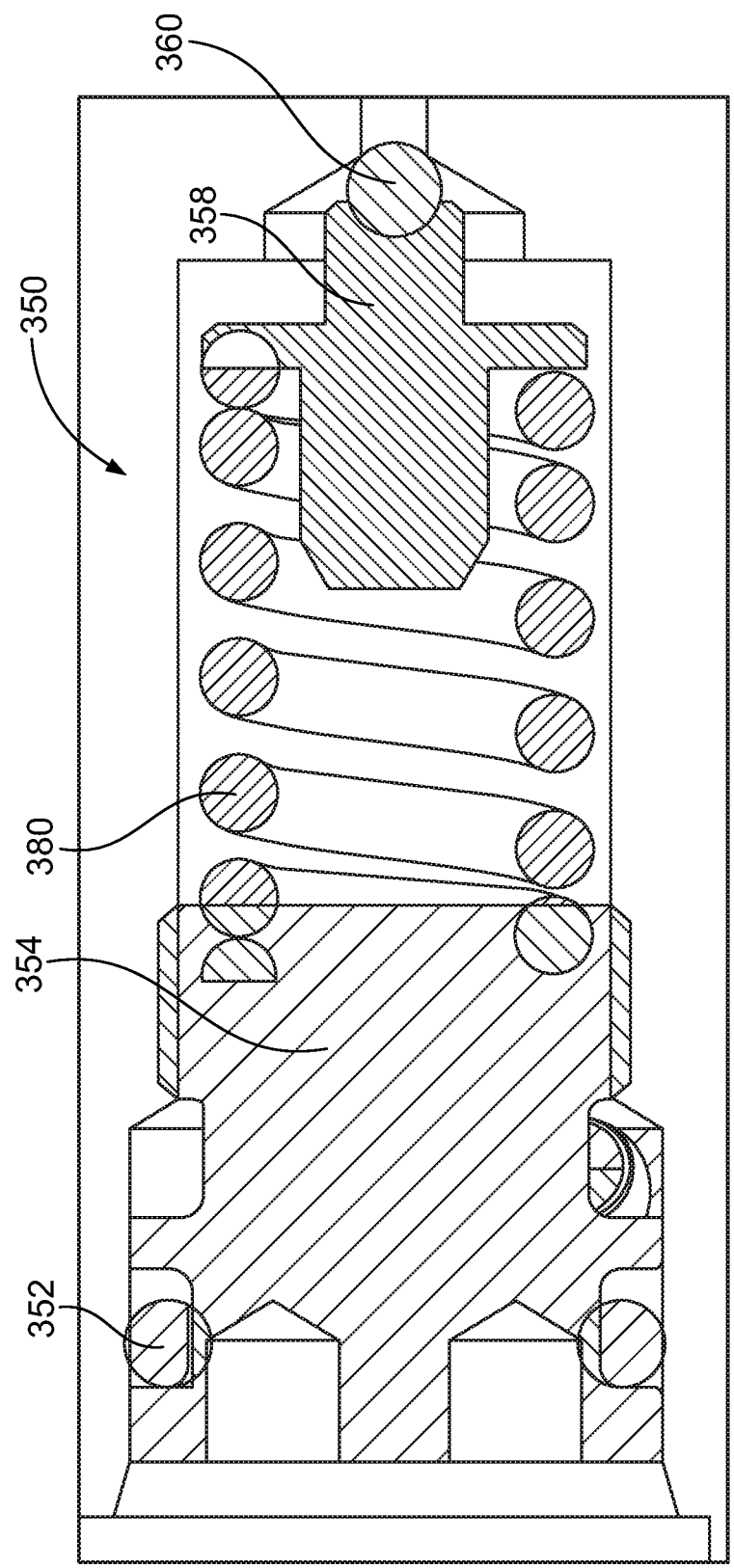
FIG. 17 is a cross-sectional view of the relief valve of the expanding tool illustrated in in FIGS. 14A and 14B.

FIG. 17 illustrates a close up view of the relief valve 350 illustrated in FIGS. 14A and B. As illustrated in FIG. 17, the relief valve 350 comprises an o-ring 352, an adjuster plug 354, a relief valve spring 356, a poppet 358, and a ball 360. In one preferred arrangement, the relieve valve 350 is configured to allow fluid flow from the acutuator 70 back into the fluid reservoir 230 in the event that a pressure within the actuator 70 exceeds the predetermined setpoint.

Figure 18:
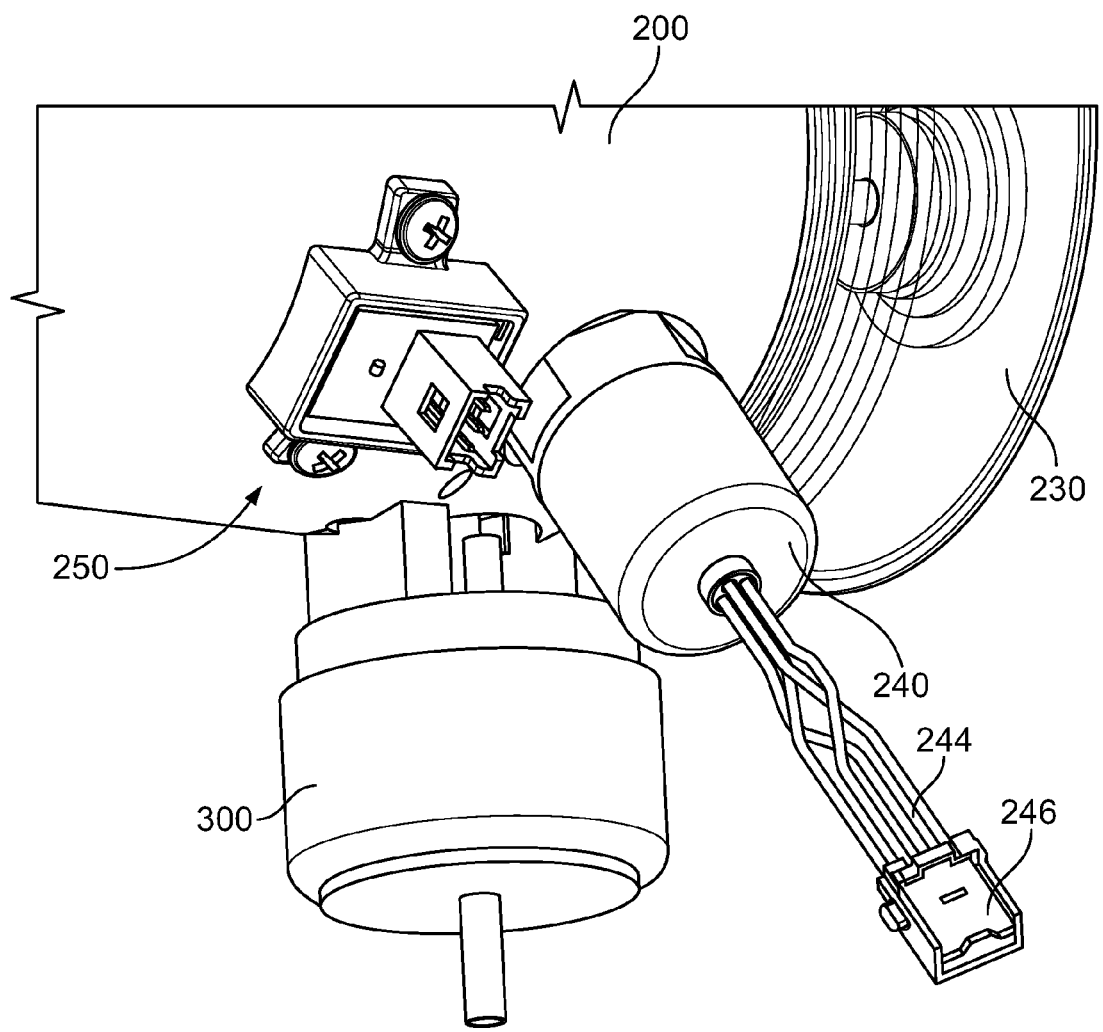
FIG. 18 is a close up view of an end of stroke detection components of the expanding tool illustrated in FIG. 1.

FIG. 18 is a close up view of end of stroke detection components of the expander tool 10 illustrated in FIG. 1. As illustrated, end of stroke detection components comprise a pressure sensor 240. Pressure sensor 240 detects full ram extension based upon a pressure within the cylinder body 200. For example, in one arrangement, pressure sensor 240 will detect full ram extension once a predetermined pressure setpoint is achieved. In one exemplary arrangement, such a full ram extension pressure setpoint might be on the order of about 7,000 to about 8,000 pounds per square inch (psi). In one preferred arrangement, once this pressure setpoint is detected by the pressure sensor 240, the motor and pump are deactivated. Retraction of both the primary ram 80 and the secondary ram 100 in the proximal direction is initiated. The pressure sensor 240 may be provided with a pressure connector 246 coupled to the sensor by way of a plurality of wires 244 for connecting to a printed circuit board provided within the expander tool 10.

A second end of stroke detection component comprises a position sensor 250. In one preferred arrangement, such position sensor 250 may take the form of a Hall Effect sensor. Such a position sensor 250 may be configured to detect a full ram return to the initial postion, such as the home positions of the primary ram 80 and the secondary ram 100 illustrated in FIG. 1. This position sensor 250 enables the motor and pump activation for the next expansion stroke. In one preferred arrangement, the position sensor 250 may be configured to detect the magnetic ring 98 provided within the outer surface groove 96 of the primary ram 80 (see, FIG. 4).

Figure 19:
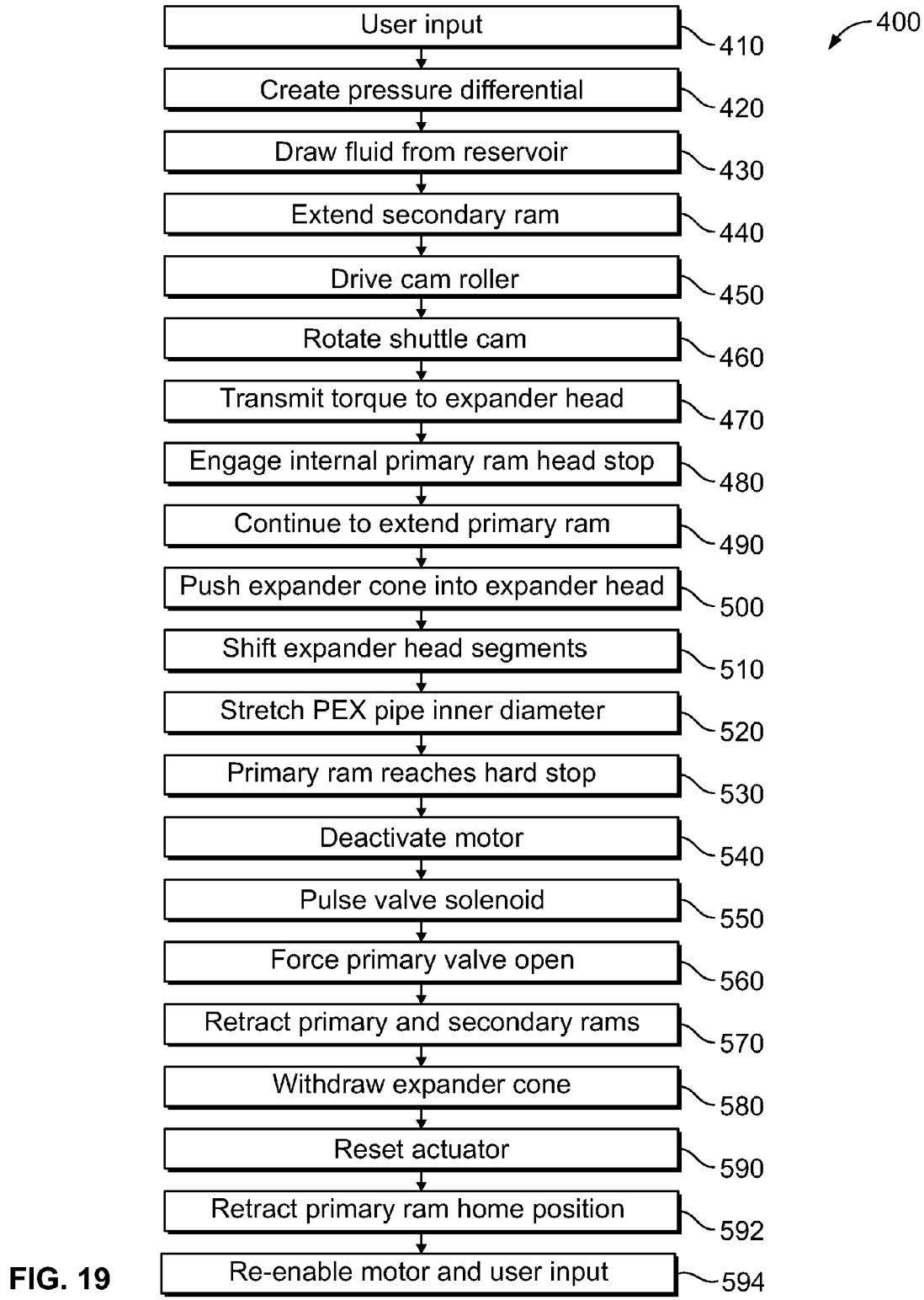
FIG. 19 illustrates an exemplary method of operating the expander tool illustrated in FIG. 1.
Figure 20:
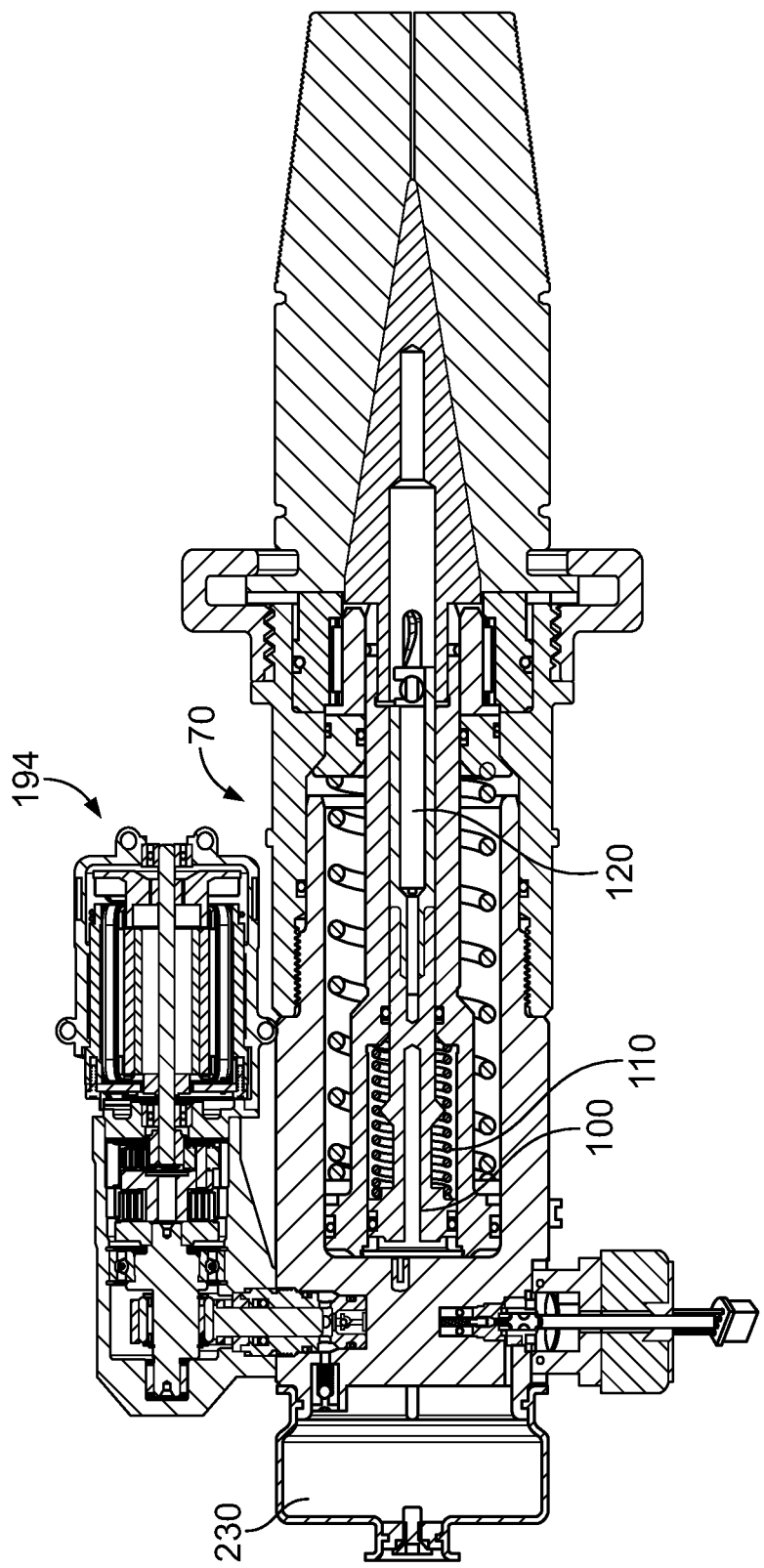
FIG. 20 illustrates a perspective view of the expander tool illustrated in FIG. 1 during a head rotation sequence.

FIG. 19 illustrates an exemplary method of operating an expander tool, such as the expander tool 10 illustrated in FIG. 1. At step 410, and now also referring to FIG. 20, a user input from a trigger starts the motor 194 (see, e.g., trigger 620 illustrated in FIG. 23). In a preferred method, the motor 194 is electronically locked on if the trigger is held for a predetermined period of time. For example, such a predetermined period of time may be greater than one second. One advantage of such a trigger lock on feature is that a user does not have to hold the trigger for the duration of the stroke. One advantage of such a trigger lock is that it prevents user fatigue and also allows the user of the expanding tool to support the tool or work piece as needed. In addition, in one arrangment, the trigger lock could also provide a user interupt of advance stroke with an additional trigger pull when the trigger lock is enabled. This would allow the user to abort an expansion if needed.

At step 420, a pressure differential is created across the primary dump valve 390 and this pressure differential shifts the primary dump valve shuttle to a closed position. At step 430, fluid is drawn from the rear fluid reservoir 230 and into a pump chamber and then pumped to the actuator 70. At step 440, the secondary ram 100 begins to extend in the distal direction as fluid is pumped into the actuator 70. As such, the secondary ram 100 begins to compress the secondary ram return spring 110. At step 450, as the secondary ram 100 begins to extend in the distal direction, the secondary ram 100 also drives the cam roller carrier 120 in the distal direction, towards the expanding head 30. As such, the cam roller 130 is pushed in the distal direction through the cam or groove 182 provided on the shuttle cam 180. At step 460, the shuttle cam 180 rotates in clutch locked direction and transmits torque to the drive collar 160. At step 470, this torque is transmitted to the expander head segments 40A-F making up the head 30.

Figure 21:
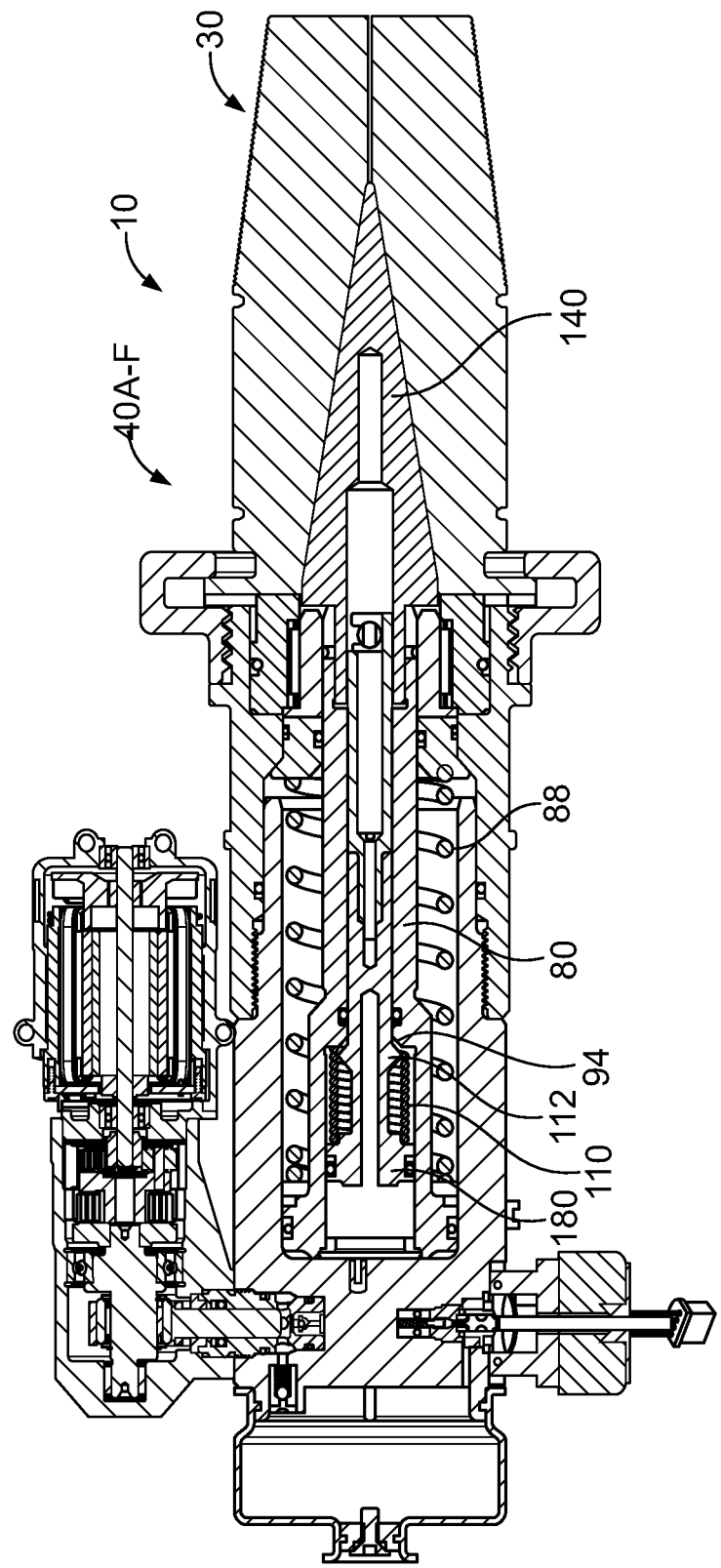
FIG. 21 illustrates a perspective view of the expander tool illustrated in FIG. 20 during a head expansion sequence.

At step 480, the secondary ram hard stop 112 of the secondary ram 100 engages the internal primary ram hard stop 94 of the primary ram 80. For example, FIG. 21 illustrates a perspective view of the expander tool 10 illustrated in FIG. 20 during a head expansion sequence. At step 490, the primary ram 80 continues to extend in a distal direction as pressure continues to build inside the actuator 70. At step 500, the expander cone 140 pushes distally into the expander head 30 and against the expander head segments 40A-F. At step 510, the expander head segments 40A-F shift radially outward to expand the expander head outer diameter. At step 520, a PEX pipe inner diameter is streched open.

Figure 22:
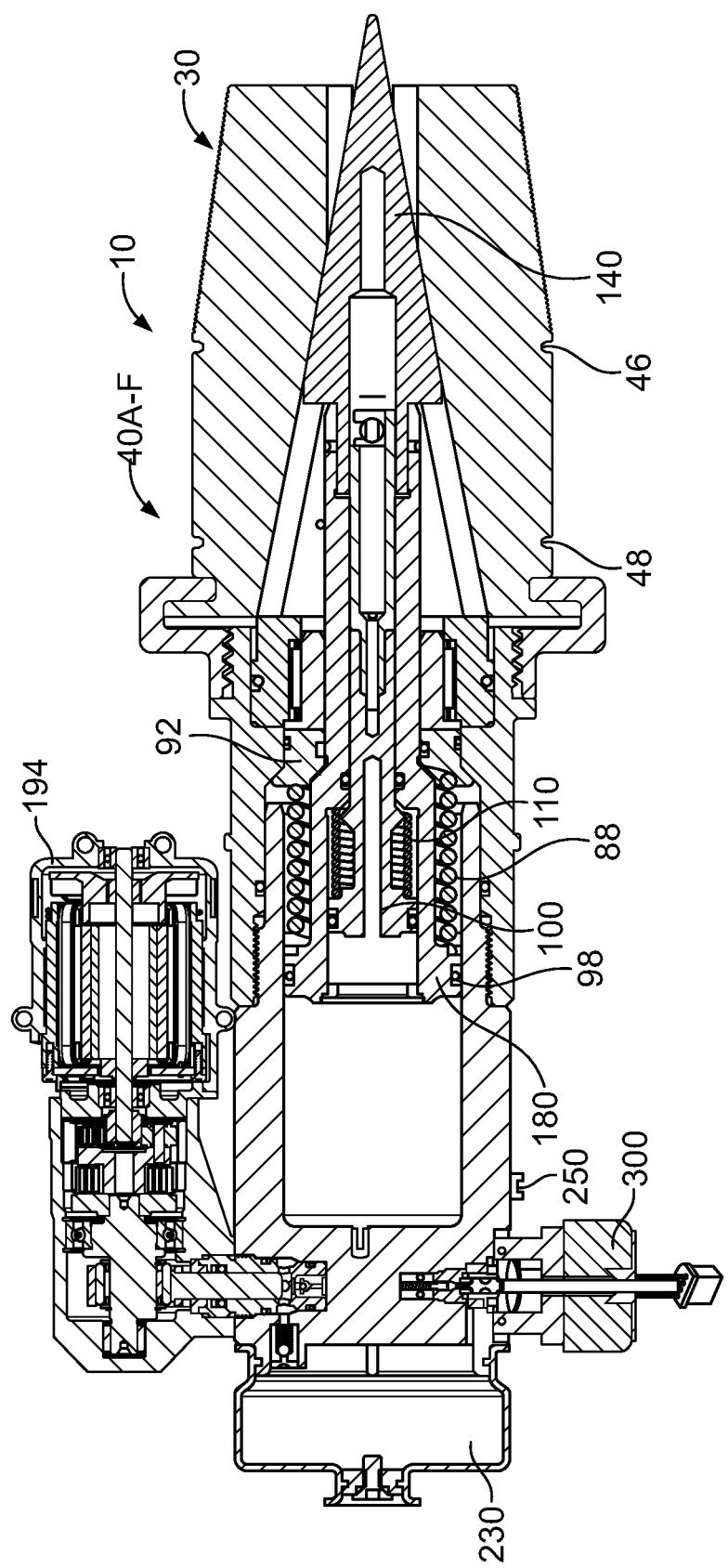
FIG. 22 illustrates a perspective view of the expander tool illustrated in FIG. 21 during a retraction sequence.

At step 530, and now referring to FIG. 22 which illustrates a perspective view of the expander tool 10 during an expansion sequence, the primary ram 80 reaches the primary ram hard-stop collar 92, and the pressure within the cylinder body 200 reaches a predetermined transducer setpoint. At step 540, once the predetermined transducer setpoint is reached, the motor 194 is deactivated. As such, motor and user input (i.e., trigger) may be disabled until a full retract of both the primary ram 80 and the secondary ram 100 is sensed, preferably by way of the position sensor 250. One advantage of such a full return sensing feature is that a user is not able to initiate another expansion stroke until the expanding tool is fully retracted. This prevents the user from overriding the auto-rotate feature.

At step 550, the valve solenoid 300 is pulsed to open the pilot dump valve 340 to the fluid reservoir 230. At step 560, internal pressure drops and therefore allows the return spring to force the primary dump valve 390 to open. At step 570, both the primary ram 80 under a force created by a compressed primary ram return spring 88 and the secondary ram 100 under a force created by a compressed secondary ram return spring 110 begin to retract. Both primary ram 80 and secondary ram 100 move in the proximal direction, back to a home position of the expansion tool 10, as illustrated in FIG. 1.

At step 580, the expander cone 140 is withdrawn from the expander head 30, and the expander head segments 40A-F begin to collapse to a closed position. In one arrangment, collapsing of the expander head segments 40A-F may may be aided by way of one or more o-rings provided in the first and/or second grooves 46,48 provided in the expander head 30 as previously described herein.

At step 590, as the primary ram 80 approaches a fully retracted position (see, FIG. 1), the cam roller 130 pulls through the cam or groove 182 provided on the shuttle cam 180. As such, the shuttle cam 180 rotates in clutch freewheel direction so as to reset the actuator 70 for a subsequent expansion.

At step 592, when the primary ram 80 reaches its fully retracted position or home postion, the position sensor 250 detects the magnetic ring 98 provided in the proximal groove 96 of the primary ram 80. At step 594, with the primary ram 80 back in its home position (see, FIG. 1), the motor 194 and user input is re-enabled for a subsequent expansion stroke. As such, when activated, the expanding tool 10 is either advancing or retracting and a user is not able to hold the expanding tool 10 in any single expanded position. One advantage of such a scenario is that a user is prevented from holding the pipe in an expanded position.

Figure 23:
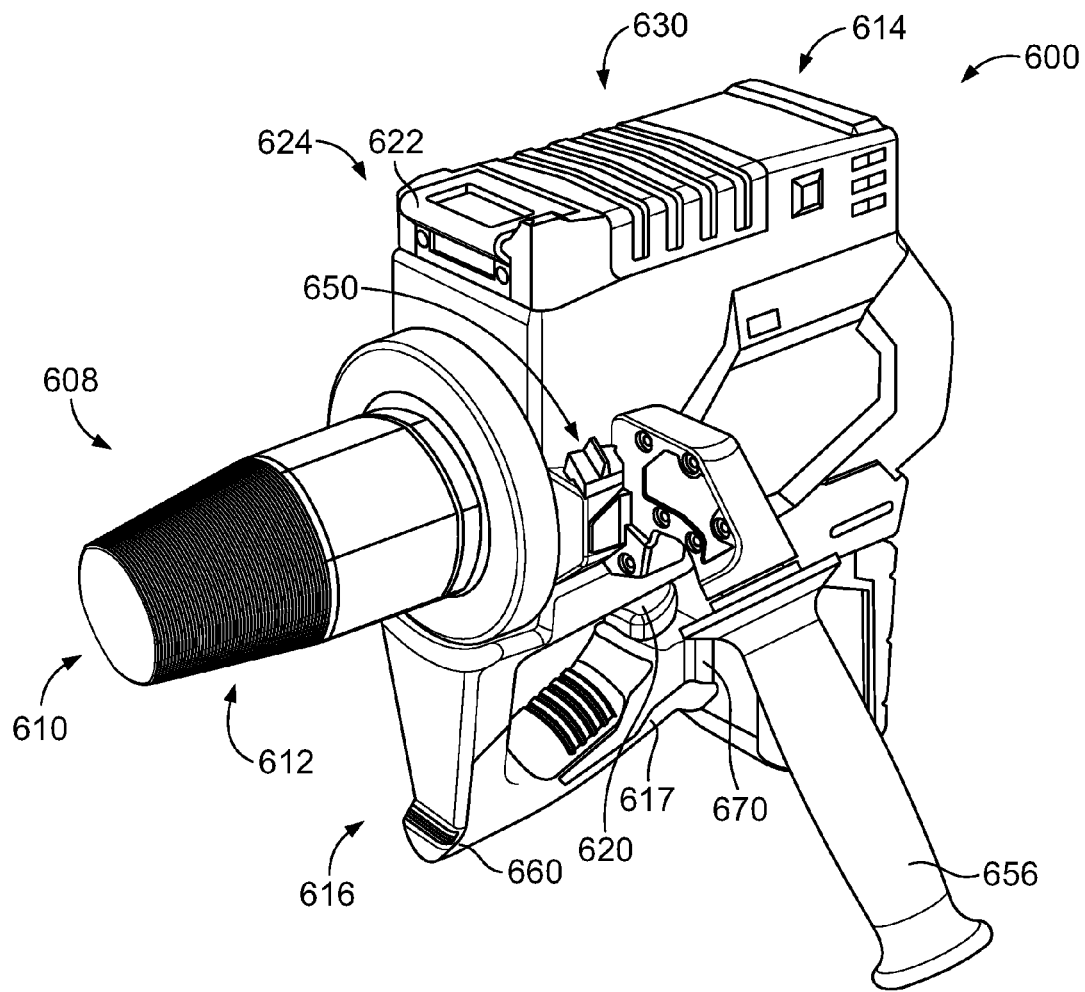
FIG. 23 illustrates an exemplary expander tool housing arrangement for use with an expander tool, such as the expander tool illustrated in FIGS. 1.
Figure 24:
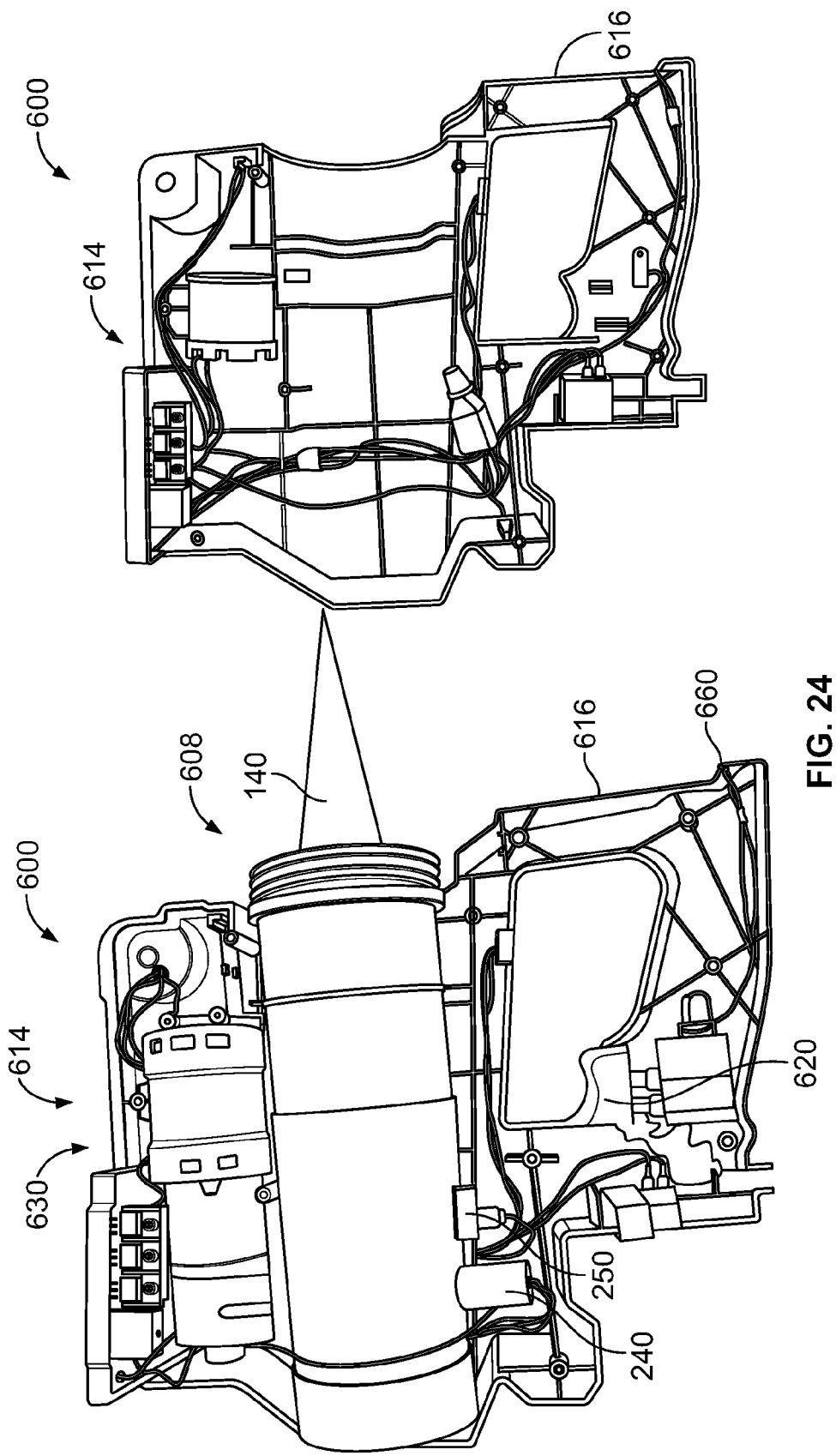
FIG. 24 illustrates a proposed layout of the exemplary expander tool housing arrangment illustrated in FIG. 23.

FIG. 23 illustrates an exemplary expander tool housing arrangement 600 for use with an expander tool, such as the expander tool 10 illustrated in FIG. 1. In particular, FIG. 23 depicts a tool 600 that is operable to expand an end of a pipe and that has an advantageous arrangement of the tool handle with respect to the working end of the tool. FIG. 24 illustrates a proposed layout of the exemplary expander tool housing arrangment illustrated in FIG. 23.

Referring now to FIGS. 23 and 24, tool 600 includes a working end 608 disposed at a distal end 610. This working end 608 includes an expander head comprising a plurality of expander head segments 612 as herein described. As previously described, these expander head segments 612 are movable between a closed position (as illustrated) and an expanded position. These are also rotatable about the longitudinal axis of the tool 600. The expander head segments 612 may operate in the same or similar fashion as the segments 40A-F described above with respect to FIGS. 1-22. In general, the expander head segments 612 may be operable to expand an end of a pipe into which the segments are inserted. Further, in an example embodiment, the tool 600 may be a very large diameter (VLD) expander. Still further, in an example embodiment, the tool 600 may be a hydraulic expanding tool. In particular, the expanding tool 600 may use hydraulics in order to facilitate operation of the tool and expansion of the end of pipes. As mentioned above, tool 600 may be used for expanding an end of PEX pipe. However, tool 600 may also be useful for other applications as well.

In practice, expanding tools may require a large amount of energy to create an amount of inverse torque that will successfully expand a pipe such as a PEX pipe. Different sized pipes and pipes of different materials may require expanding tools that create different amounts of inverse torque. In an example, tool 600 is a ten (10) ton compression tool with a one (1) inch jaw opening. Other examples are possible as well. For instance, tool 600 may accommodate a number of tons higher or lower that ten (10), and the jaw opening may also be greater than or less than one (1) inch.

The tool 600 further includes a main body 614 connected to the working end 608. The main body 614 may house tool components, such as internal tool components for facilitating operation of the jaws and hydraulic components. In one preferred arrangement, the main body includes the expanding tool 10 illustrated and described herein.

Further, the main body 614 includes a handle 616 disposed at a proximal end 518 along the vertical axis of the tool. As depicted, the handle 616 is configured to be gripped in an orientation that is substantially parallel to the longitudinal axis of the tool. The tool 600 further includes a trigger 620 disposed on the handle 616, and the trigger 620 is configured to be activated by trigger movement along the vertical axis of the tool 600. The user may activate the trigger 620 in order to initiate and/or control operation of the working end 608. In an example, the trigger movement along the vertical axis comprises movement in a proximal direction along the vertical axis. For instance, a user may activate the trigger 620 by pulling the user's trigger finger proximally or down in the vertical direction along the vertical axis of the tool 600. In another example, trigger movement may include movement in a different direction, such as in a longitudinal direction. For instance, the trigger may be configured to be moved in a distal longitudinal direction. Other example trigger movements are possible as well.

The tool 600 further includes a hook ring 622 disposed at a distal end 624 along the vertical axis of the tool 600. The hook ring 622 may be used for attachment of a carabiner, a lanyard, a sling or some other similar device.

The tool further forms a substantially flat surface 630. One advantage of such a flat surface 630 is that it enables bench-top use of the expanding tool. Another advantage of such a surface 630 is that it allows for second hand placement for vertical riser applications.

In the example depicted in FIG. 23, the trigger 620 is located on a longitudinal proximal side 617 of the handle. However, in other examples, the trigger 622 may be located in other positions at or near the handle 616, such as the longitudinal distal side of the handle 616. Further, the handle 616 is positioned proximal to the working end 608 along the longitudinal axis 604. This proximal placement allows for the working end 608 to be fully inserted into a pipe without the handle 616 causing an obstruction.

In an example embodiment, tool 600 may include one or more additional supports (e.g., handle(s) that provide the user additional ways to support the tool. Providing additional support may be helpful to the user during operation or transport of the tool 600. For instance, tool 600 includes a side-handle attachment portion 650 into which the side handle 656 can be inserted. FIG. 23 depicts side handle 656 inserted into the side handle attachment 650. Other additional supports are possible as well.

The tool 600 further comprises a work light 660 and a lock off switch 670.

In an example embodiment, tool 600 may be operated by a single hand of user. By being configured to be operated by a single hand of the user, the user may use his or her free hand in order to position and/or stabilize a pipe that is being expanded.

Beneficially, a tool in accordance with the present disclosure offers example advantages over existing tools for expanding the end of a pipe or tube. For instance, through the unique disclosed orientation of the handle, the tool 600 offers a user the ability to conveniently operate the tool in a plurality of orientations and in compact spaces. As mentioned above, a technician may use tool 600 for repair of pipes and/or installation of pipes, and this repair or installation work may require the technician to work in tight spaces as well as to use the tool in different locations. As particular examples, a technician may need to use the tool to install or repair a pipe positioned on the floor, on a sidewall, or overhead. Further, these pipes may be arranged in a plurality of different orientations. For instance, the pipe end to be expanded may be facing vertically downwards, vertically upwards, longitudinally to the left, longitudinally to the right, or at many other angles.

It may be difficult or not possible to use existing expanding tools in such a plurality of orientations. However, since tool 600 is configured to allow the user to operate the tool 600 in a number of different and useful orientations, a user may use the tool in a variety of situations and places in which operating existing tools would be difficult or not possible. For example, the handle orientation in accordance with the disclosure beneficially allows the user to more easily use—compared to existing expanding tools—the tool in an overhead position. Additionally, the orientation of the handle may allow a user to more easily support an expanding tool in the overhead position. A tool such as a ten ton tool may be heavy and thus difficult to not only position the tool but also hold and support the tool in place during operation. Tool 600 beneficially allows a user to utilize the tool in an overhead orientation without bending or substantially bending the user's wrist. This may allow the user to more comfortably support the tool for overhead installation or repair work.

Exemplary embodiments have been described above. Those skilled in the art will understand, however, that changes and modifications may be made to these embodiments without departing from the true scope and spirit of the invention. The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. An expanding tool comprising:
   a housing defining a first cavity therein;
   a primary ram disposed within the first cavity of the housing, wherein the primary ram defines a second cavity;
   a secondary ram disposed in the second cavity of the primary ram;
   a drive collar positioned at a distal end of the first cavity;
   a shuttle cam positioned at a distal end of the primary ram, wherein the shuttle cam is operably coupled to the secondary ram;
   a roller clutch disposed between the drive collar and the shuttle cam; and an expander head operably coupled to the drive collar, wherein when the expanding tool is triggered, the secondary ram moves in a distal direction causing the shuttle cam and the drive collar to rotate about the primary ram, as the drive collar rotates, the expander head rotates a predetermined rotation amount.

2. The expanding tool of claim 1, wherein the primary ram comprises a proximal end and a distal end, the primary ram further comprising a primary ram flange at the proximal end of the primary ram.

3. The expanding tool of claim 2, further comprising:
a primary ram hard-stop collar disposed within the first cavity.

4. The expanding tool of claim 3, further comprising:
a primary ram return spring provided along an external surface of the primary ram between the primary ram flange and a proximal face of the primary ram hard-stop collar.

5. The expanding tool of claim 1, wherein the shuttle cam is seated along a distal face of the primary ram hard-stop collar.

6. The expanding tool of claim 1,
wherein the secondary ram comprises a proximal end and a distal end, and
wherein the secondary ram includes a secondary ram flange at the proximal end of the secondary ram.

7. The expanding tool of claim 6,
wherein the second cavity comprises a stepped cavity, and
wherein a secondary ram return spring is provided along an external surface of the secondary ram between the secondary ram flange and a step surface of the stepped cavity.

8. The expanding tool of claim 7, wherein the secondary ram includes a ridge that protrudes outward from the external surface of the secondary ram.

9. The expanding tool of claim 8, wherein the expander head rotates until the ridge of the secondary ram reaches the step surface of the stepped cavity.

10. The expanding tool of claim 9, further comprising:
an expander cone coupled to the primary ram, wherein the expander head comprises a plurality of expander head segments, wherein, when the ridge of the secondary ram reaches the step surface of the stepped cavity: (i) rotation of the expander head stops, and (ii) the secondary ram and the primary ram move together in the distal direction driving the expander cone toward the expander head causing the plurality of expander head segments to expand radially.

11. The expanding tool of claim 1, wherein the roller clutch is configured to allow the drive collar to freewheel on the shuttle cam in a first rotary direction and allow the shuttle cam to engage and rotate the drive collar in a second rotary direction opposite the first rotary direction.

12. The expanding tool of claim 1, wherein the shuttle cam includes a slanted groove that forms a cam, and wherein the expanding tool further comprises:
a cam roller coupled to the secondary ram, wherein the cam roller is positioned within, and configured to roll along an internal surface of, the groove.

13. The expanding tool of claim 12, further comprising:
a cam roller carrier coupled to the secondary ram, wherein the cam roller carrier is cylindrical in shape and comprises the cam roller at a distal end of the cam roller carrier.

14. The expanding tool of claim 1, wherein the drive collar comprises an engaging face comprising a plurality of lugs.

15. The expanding tool of claim 14, wherein a proximal surface of the expander head comprises a plurality of grooves that are geometrically configured to match the plurality of lugs of the engaging face of the drive collar, such that rotation of the drive collar causes the expander head to rotate.

16. The expanding tool of claim 15, wherein the plurality of lugs comprise a trapezoidal geometrical configuration and the plurality of grooves of the expander head are trapezoidal to match the plurality of lugs.

17. The expanding tool of claim 1,
wherein the expander head comprises a plurality of expander head segments, and
wherein an outer surface of the plurality of expander head segments comprises a plurality of ribs provided near a frustoconical end of the expander head.

18. The expanding tool of claim 1, further comprising:
a motor, and
a pump, wherein activation of the motor causes the pump to provide pressurized hydraulic fluid to the first cavity causing the secondary ram to move in the distal direction.

19. The expanding tool of claim 18, further comprising:
a pressure sensor configured to provide pressure sensor information indicative of a pressure level of the pressurized hydraulic fluid in the first cavity, wherein, when the pressure sensor information indicate that the pressure level of the pressurized hydraulic fluid in the in the first cavity has reached a predetermined pressure level, the motor is deactivated.

20. The expanding tool of claim 19, further comprising:
a dump valve connecting the first cavity to a fluid reservoir, wherein, when the motor is deactivated, the dump valve is activated so as to provide a path for the pressurized hydraulic fluid in the first cavity to flow to the fluid reservoir.

* * * * *